US008825187B1

(12) United States Patent
Hamrick et al.

(10) Patent No.: US 8,825,187 B1
(45) Date of Patent: Sep. 2, 2014

(54) SURROUND SOUND IN A SENSORY IMMERSIVE MOTION CAPTURE SIMULATION ENVIRONMENT

(75) Inventors: Cameron Travis Hamrick, Marietta, GA (US); Nels Howard Madsen, Auburn, AL (US); Thomas Michael McLaughlin, Miramar Beach, FL (US)

(73) Assignee: Motion Reality, Inc., Marietta, GA (US)

( * ) Notice: Subject to any disclaimer, the term of this patent is extended or adjusted under 35 U.S.C. 154(b) by 322 days.

(21) Appl. No.: 13/421,444

(22) Filed: Mar. 15, 2012

Related U.S. Application Data

(60) Provisional application No. 61/452,817, filed on Mar. 15, 2011.

(51) Int. Cl.
*G06F 17/00* (2006.01)
(52) U.S. Cl.
USPC .......................................................... 700/94
(58) Field of Classification Search
USPC ................. 700/94; 463/32–35; 434/308, 309; 381/310, 56, 58, 61, 119
See application file for complete search history.

(56) References Cited

U.S. PATENT DOCUMENTS

| 4,695,058 | A | * | 9/1987 | Carter et al. ........................ 463/5 |
| 5,633,993 | A | * | 5/1997 | Redmann et al. ............. 345/419 |
| 6,054,991 | A | * | 4/2000 | Crane et al. .................... 345/420 |
| 8,170,222 | B2 | * | 5/2012 | Dunko ............................ 381/58 |
| 8,520,872 | B2 | * | 8/2013 | Jang et al. ...................... 381/310 |
| 2006/0029243 | A1 | * | 2/2006 | Gerrard et al. ................ 381/310 |
| 2006/0038890 | A1 | * | 2/2006 | MacIntosh et al. ....... 348/211.99 |
| 2009/0238378 | A1 | * | 9/2009 | Kikinis et al. .................. 381/92 |

* cited by examiner

*Primary Examiner* — Andrew C Flanders
(74) *Attorney, Agent, or Firm* — King & Spalding

(57) ABSTRACT

A wearable computing device of the listener entity can receive 3D motion data of a virtual representation of the listener entity, 3D motion data of a virtual representation of a sound emitter entity and audio data. The audio data may be associated with an audio event triggered by the sound emitter entity in a capture volume. The wearable computing device of the listener entity can process the 3D motion data of the virtual representation of a listener entity, the 3D motion data of the virtual representation of the sound emitter entity and the audio data to generate a multi channel audio output data customized to the perspective of the virtual representation of a first entity. The multi channel audio output data may be associated with the audio event. The multi channel audio output data can be communicated to the listener entity through a surround sound audio output device.

26 Claims, 14 Drawing Sheets

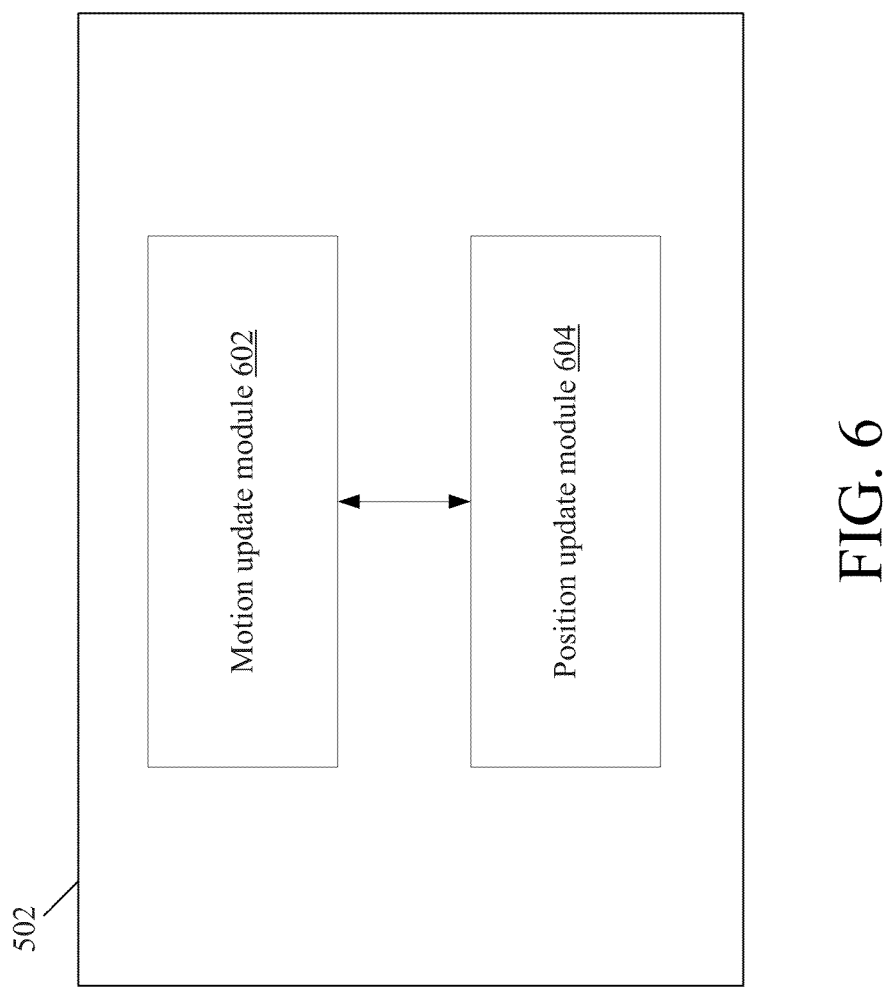

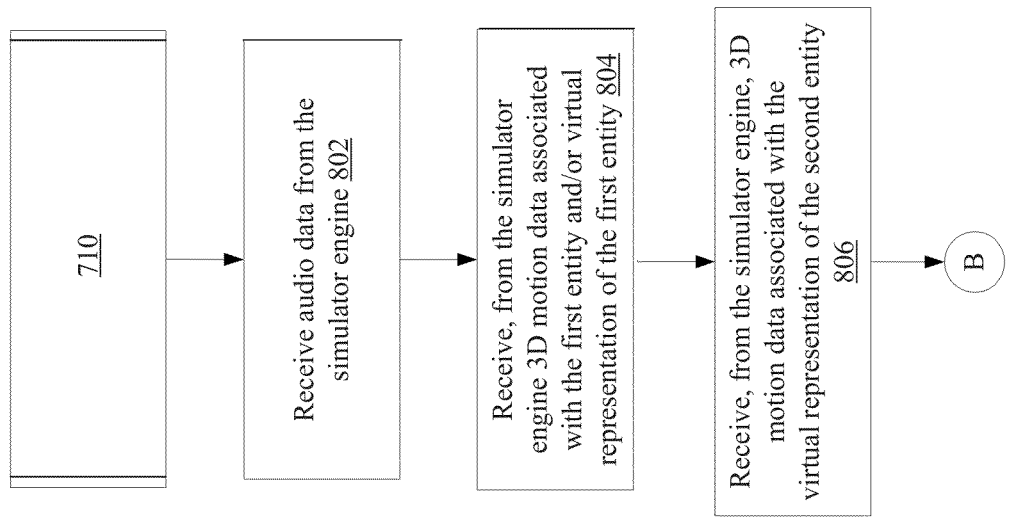

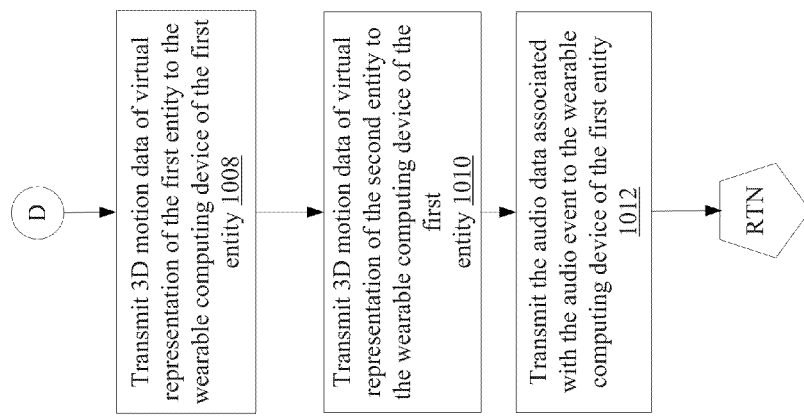

SURROUND SOUND IN A SENSORY IMMERSIVE MOTION CAPTURE SIMULATION ENVIRONMENT

CROSS REFERENCE TO RELATED APPLICATIONS

This application claims priority to U.S. Provisional Patent Application No. 61/452,817 filed Mar. 15, 2011 in the name of Cameron Travis Hamrick, Nels Howard Madsen, and Thomas Michael McLaughlin and entitled "3D-Surround Sound for a Sensory Immersive Motion Capture Simulation System," the entire contents of which are hereby incorporated herein by reference.

FIELD OF INVENTION

This disclosure relates generally to a technical field of simulation systems and, in one example embodiment, to a system, method and an apparatus for surround sound in a sensory immersive motion capture simulation environment.

BACKGROUND

Training in realistic situations often yields substantial performance improvement. However, with conventional technology such realistic training can pose high risk to the training participant, especially if the training involves performance of potentially dangerous tasks or operations in hostile and/or potentially threatening environments. Further, training in realistic situations can be cost intensive.

Simulating a realistic situation can provide a reduced risk training capability to the participant. However, simulations often have a suspension of disbelief barrier due various reasons such as technical or hardware limitations. The suspension of disbelief barrier can cause a realism of the simulation to be compromised, thereby causing the participant be un-immersed in the simulation. Further, the suspension of disbelief barrier can cause a performance improvement of the participant to be below par as compared to training in the realistic situations, because the participant is un-immersed in the simulation. Thus, there is a need for a technology that reduces the suspension of disbelief barrier in a simulation system.

SUMMARY

A sensory immersion motion capture simulation system can provide a capability for participants of the sensory immersion motion capture simulation system to hear as well as to generate sounds appropriate to their activities and to their position and orientation in the a virtual environment. When a participant can hear the sounds of props, simulated characters, and other participants in the virtual environment in an acoustically accurate manner, situational awareness is improved and the barriers to suspension of belief are lowered. The sensory immersion motion capture simulation system can provide a simulated environment with acoustically accurate, individualized sound for each participant.

The term "sensory immersion motion capture simulation system," as used herein, generally refers to any simulation system that provides a real time immersion into a virtual reality environment whereby a participant's movements and/or actions are immediately and accurately translated into corresponding movements and/or actions of the virtual representation of the participant (avatar). A sensory immersion experience may generally refer a participant's experience where the participant's mind perceives a simulated virtual environment substantially as if it were real and/or further interacts with the simulated virtual environment substantially as if it were the real world. The term "sensory immersion motion capture simulation environment," can generally refer to any simulated environment (e.g., virtual world) that can provide a sensory immersion experience to a participant.

The term "virtual character," as used herein, generally refers to a simulated character that is computer generated and computer controlled. In one embodiment, the virtual character can be a software representative of a simulated character. In some embodiments, a prerecorded virtual representation of the participant from a previous simulation can be used as virtual characters in a current simulation.

The term "audio event" as used herein, generally refers to an event that triggers a corresponding sound to be played in a virtual world. The audio event may be initiated in the virtual world or the real world.

Disclosed are a system, a method and an apparatus for surround sound in a sensory immersive motion capture simulation environment.

In one aspect of the present invention, a method can include processing a high fidelity 3D motion data that is determined from a real time motion capture and an audio data to facilitate a participant emitting and receiving real-time, individualized, acoustically accurate audio in a sensory immersive real time virtual reality simulation. In one representative option, the method includes receiving an audio data responsive to a second entity triggering an audio event. The second entity may refer to a sound emitter entity that triggers an audio event. Triggering the audio event may generate a corresponding sound in the simulated virtual environment as if the sound were originating from the avatar of the sound emitter entity that triggered the audio event. The sound corresponding to the audio event may be stored in an audio file. The audio data can include information that associates the audio event to an audio file. The audio data can also include information that indicates a mode of processing the audio file. The mode of processing the audio file can include, inter alia playing the audio file, stop playing the audio file and continue playing the audio file. The audio data can be generated by a simulator engine.

The method can further include receiving 3D motion data of a virtual representation of a first entity in the simulated virtual environment. The first entity may refer to a listener entity that can hear a sound generated by a sound emitter entity and/or other sounds generated in the capture volume and/or the simulated virtual environment. The first entity can be an animate object in the capture volume, such as a human being (e.g., participant). The 3D motion data of the virtual representation of the first entity can be determined based on the 3D motion data of the first entity in a capture volume. The first entity in the capture volume may be motion captured using one or more motion capture devices in the capture volume. The motion capture data can be used to determine the 3D motion data of the first entity. The motion capture data can include an image of the capture volume where the first entity is located and/or a recording of the capture volume.

The method also can include receiving 3D motion data of a virtual representation of a second entity. The second entity can be any animate or inanimate object in the capture volume, such as a human being (e.g., participant) or a weapon used by the participant. In another representative option, the second entity can be a virtual character. In the representative option where the second entity is any animate or inanimate object in the capture volume, the 3D motion data of the virtual representation of the second entity can be determined based on the 3D motion data of the second entity in a capture volume. The second entity in the capture volume may be motion captured using one or more motion capture devices in the capture volume. The motion capture data can be used to determine the 3D motion data of the second entity. The motion capture data can include an image of the capture volume where the second entity is located and/or a recording of the capture volume.

The method can further include processing the audio data, the 3D motion data of the virtual representation of the first entity and the 3D motion data of a virtual representation of the second entity to generate multi-channel audio output data customized to a perspective of the virtual representation of the first entity. The multi-channel audio output data may be associated with the audio event. In addition, the multi-channel audio output data can be communicated to the first entity through a surround sound audio output device (e.g., surround sound headphones).

The term "multi-channel audio output data customized to the perspective of the virtual representation of the first entity," as used herein, may generally refer to a surround sound audio output data that can cause the first entity to hear the sounds of the simulation environment with the same audio cues as real life, as it relates to the direction and distance of objects emitting sound (e.g., second entity). In one embodiment, multi-channel audio output data customized to the perspective of the first entity may refer to an acoustically accurate sound in terms of the direction and distance of the origin of the sound (e.g., second entity in capture volume/virtual representation of second entity in simulated virtual environment). For example, if a system includes user A, user B and user C. User B is the listener entity and user A and user C are the sound emitter entities. User A is located to the left of user B and user C is located to the right of user C both in a capture volume and the corresponding simulated virtual environment. User A and user B generate distinct sounds. The multi channel audio output customized to the perspective of the user B is such that when the multi channel audio output is outputted to user B, user B can hear the sound generated by user A as if it originated from the left side and the sound generated by the user C as if it originated from the right side. Further, the sounds can be attenuated based on a distance between user A and user B as well as user A and user C respectively. User B can hear the sounds when in simulation just as user B would hear it in real life with respect to distance and direction of the origin of the sounds. The multi-channel audio output data customized to the perspective of the first entity may cause the first entity to be sensory immersed in the motion capture simulation environment.

The methods, systems and apparatuses disclosed herein may be implemented in any appropriate means for achieving various aspects, and may be executed in a form of a machine-readable medium embodying a set of instructions that, when executed by a machine, cause the machine to perform any of the operations disclosed herein. These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

Example embodiments are illustrated by way of example and not limitation in the figures of accompanying drawings, in which:

FIG. 6 illustrates a block diagram of the audio mixing module, according to certain exemplary embodiments of the present invention.

FIG. 8A illustrates a flow chart that depicts the method of a wearable computing device of the listener entity, according to certain exemplary embodiments of the present invention.

FIG. 10B illustrates a continuation of the flow chart in FIG. 10A depicting the method of the simulator engine, according to certain exemplary embodiments of the present invention.

Figure 1:
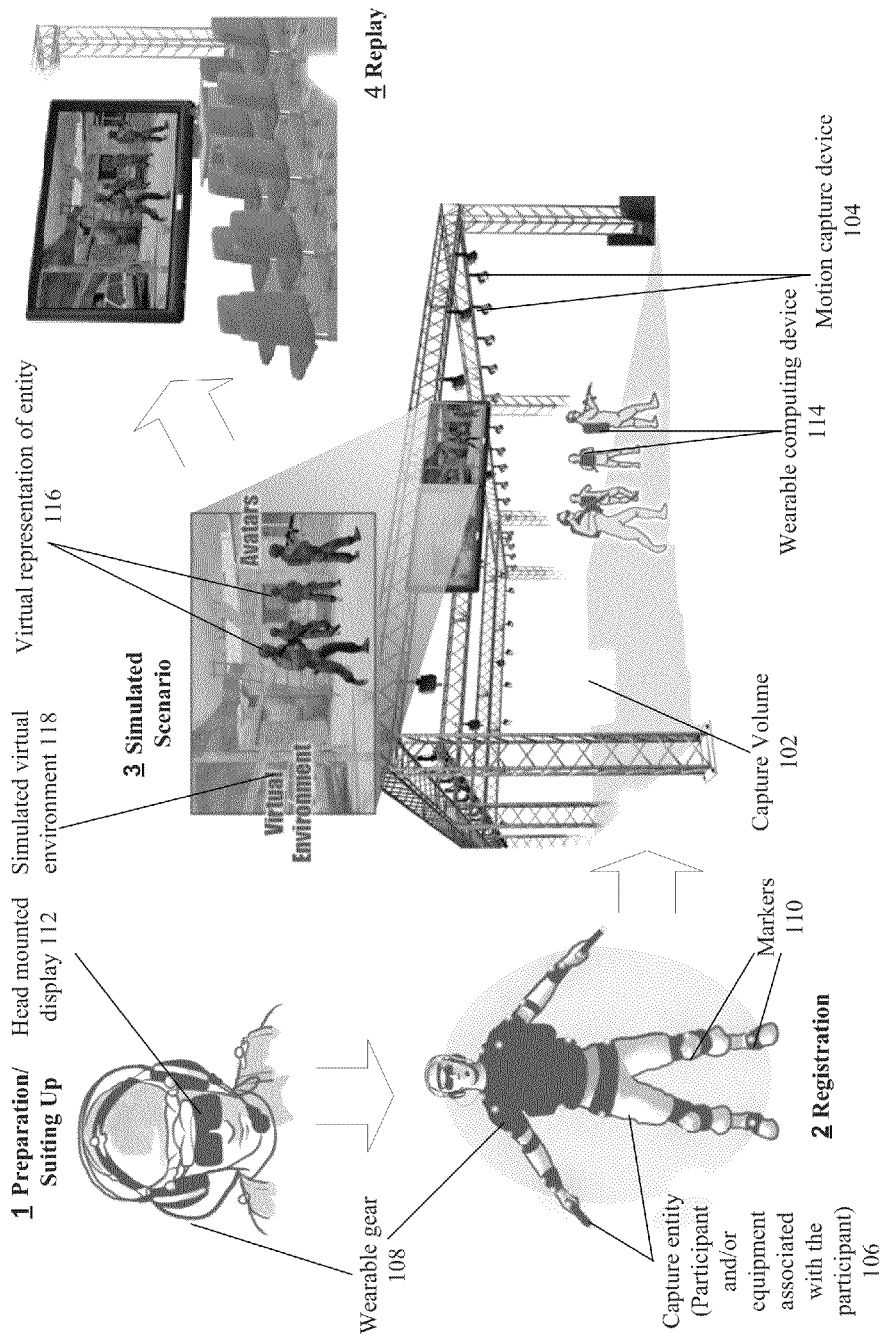
FIG. 1 illustrates a sensory immersive motion capture simulation system, according to certain exemplary embodiments of the present invention.

Many aspects of the invention can be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION

Disclosed are a system, a method and an apparatus for surround sound in a sensory immersive motion capture simulation environment. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

FIG. 1 illustrates a sensory immersive motion capture simulation system, according to certain exemplary embodiments of the present invention. In particular, FIG. 1 illustrates a capture volume 102, a motion capture device 104, a capture entity 106, a wearable gear 108, markers 110 coupled to the wearable gear 108, a head mounted display device (hereinafter "HMD" device) 112, a wearable computing device 114, a simulated virtual environment 118 and a virtual representation of an entity (hereinafter "capture entity's avatar") 116.

In one embodiment, a sensory immersive motion capture simulation system 100 (hereinafter "motion capture simulation system") can provide a near real-time sensory immersion of a capture entity 106 into a three dimensional simulated virtual environment 118 (hereinafter "simulated virtual environment" 118). A sensory immersion experience can be characterized as a user's experience where the user's mind perceives a simulated virtual environment substantially as if it were real and/or interacts with the simulated virtual environment substantially as if it were the real world.

In the simulated virtual environment 118, the capture entity 106 can be represented by an avatar 116. Using a capture and simulation unit 202 (shown in FIG. 2), the motion capture simulation system 100 can characterize movements and/or actions of the capture entity 106 with high fidelity. Further, the movements and actions of the capture entity 106 can be nearly immediately and accurately translated into corresponding movements and actions of the capture entity's avatar 116 in the simulated virtual environment 118. For example, when a capture entity 106 walks in the capture volume 102, nearly simultaneously the capture entity's avatar walks in the simulated virtual environment 118 based on the capture entity's 106 walking motion that is captured using the capture and simulation unit 202. Similarly, when the capture entity 106 crawls in the capture volume 102, nearly simultaneously the capture entity's avatar crawls in the simulated virtual environment 118 based on the capture entity's 106 crawling motion that is captured using the capture and simulation unit 202. In one embodiment, movement and/or action of a capture entity 106 in the space represented by the capture volume 102 can be recorded and/or captured using the motion capture device 104 of the capture and simulation unit 202. The capture and simulation unit 202 and the motion capture device 104 are described in further detail below, in connection with FIG. 2 and FIG. 4.

In one embodiment, the capture entity 106 can be any object in the capture volume 102 that is motion captured into the simulated virtual environment 118 using a motion capture device 104. In one embodiment, the capture entity 106 can be a living being (participant), such as a human being. In another embodiment, the capture entity 106 can be both a participant and an equipment (weapon, racket, wand, stick, etc.) associated with the participant, such as a weapon held by a human being. In another embodiment, the capture entity 106 can be an ammunition and/or a model of the ammunition carried by the living being. In yet another embodiment, the capture entity 106 can be any physical or mechanical body including a physical prop in the capture volume 102.

In one embodiment, the simulated virtual environment 116 can contain a number of avatars. In one embodiment, each avatar of the number of avatars can represent one or more capture entities respectively. The motion of the capture entity's avatar 116 in the simulated virtual environment 118 can be driven based on the motion of the capture entity 106 in the capture volume 102 that is captured using the motion capture device 104. In one embodiment, both the capture entity avatars and virtual characters can coexist in the same the simulated virtual environment 118.

In one embodiment, the simulated virtual environment 118 can contain a custom designed virtual universe that includes any appropriate objects (e.g., props, scenery, etc.) associated with the events or situations being simulated. For example, the virtual universe can represent a village, an urban city, a jungle, etc including the appropriate objects such as huts, trees, etc. The virtual universe can provide a context in which the avatars 116a-n can exist and interact.

In one embodiment, a motion capture device 104 in the capture volume 102 can capture the movement and/or actions of the capture entity 106 (hereinafter "motion data"). In one embodiment, the motion data can be a motion attribute of the capture entity 106. In one embodiment, when the capture entity 106 is a participant, the motion data can include, inter alia, a position, an orientation and/or a velocity of movement of the participant's head. When the capture entity 106 is an ammunition and/or a model of the ammunition, the motion attribute can include inter alia, a position, an orientation and/or a velocity of movement of the ammunition and/or a model of the ammunition. In one embodiment, the motion data can include a position of the participant's head, an orientation of the participant's head, a velocity of movement of the participant's head, a position of the object associated with the participant (e.g., gun), an orientation of the object associated with the participant (e.g., gun), and/or a velocity of movement of the object associated with the participant (e.g., gun).

Figure 4:
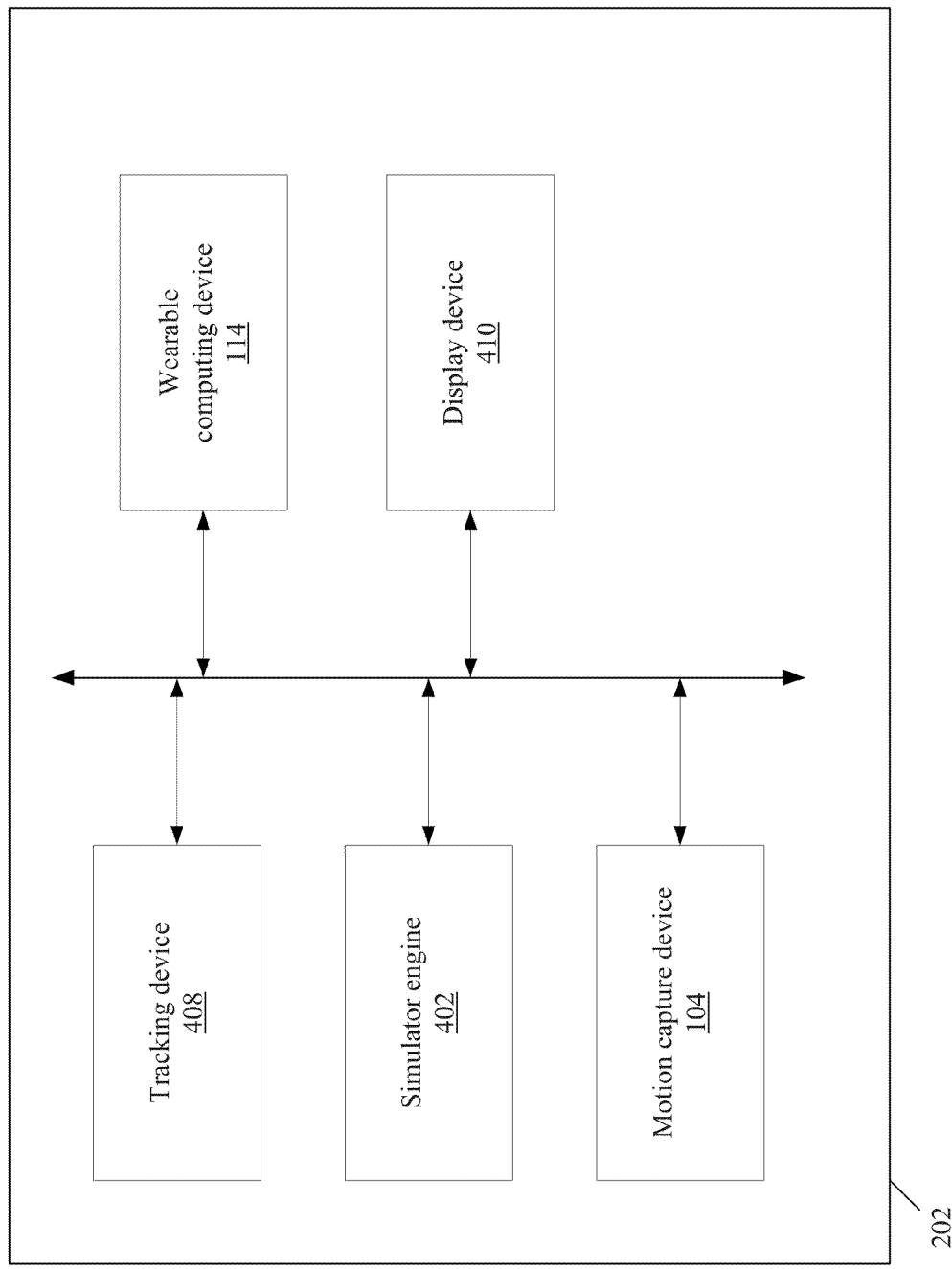
FIG. 4 illustrates a block diagram of the capture and simulation unit of FIG. 2, according to certain exemplary embodiments of the present invention.

The motion capture device 104 can transmit the motion data to a simulator engine 402 (shown in FIG. 4). The motion data of the capture entity 106, along with other capture entity-specific information such as sound and physiological data, can be used by the simulator engine to control the behaviors and/or interactions between objects and avatars in the simulated virtual environment 118. The simulator engine 402 can manage the immersion of the capture entity 106 into the virtual environment by providing visual, auditory, tactile, and/or olfactory feedback to the capture entity 106 in near real time. The simulator engine 402 is described in greater detail below, in association with FIG. 4.

In one embodiment, the visual feedback can be provided to an HMD 112 worn by the capture entity 106. The visual feedback can drive a 1st person stereoscopic point of view (POV) display provided for the capture entity 106 via an HMD 112. The audio feedback can be managed by providing a surround-sound effect through individual headphones and/or a general multi-speaker sound system. Tactile and olfactory feedback can be provided through respective devices associated with the capture entity 106. The feedback loop created by the capture entity's interaction with the data processed by and/or emanating from the simulator engine provides an immediate and tactile experience drawing the capture entity 106 into a feeling that the experience is real (e.g., sensory immersive experience).

In one embodiment, the motion capture simulation system 100 includes a capture volume 102. In one embodiment, the capture volume 102 can be a large room and/or any appropriate volume of space that is monitored by the motion capture device 104 of the capture and simulation unit 202. In one embodiment, the capture volume 102 may include one or more motion capture devices to provide a three dimensional (3D) image and/or recording of the capture volume 102 that includes the capture entity 106. The one or more motion capture devices can be distributed in the capture volume 102 in such a way that it can scan the entire volume of space represented by the capture volume 102. The one or more motion capture devices can three dimensionally capture the volume of space represented by the capture volume. In one embodiment, the capture volume 102 can accommodate one or more capture entities. In one embodiment, the one or more capture entities can participate together in a simulated scenario in the simulated virtual environment 118 through each capture entity's avatar. In one embodiment, the position and orientation of the capture entity's avatar relative to another capture entity's avatar in the simulated virtual environment 118 can correspond to the position and orientation of the capture entity relative to the other capture entity in the capture volume 102. For example, if capture entity A is to the left of capture entity B in the capture volume, then the position and orientation of capture entity A's avatar is to the left of capture entity B's avatar in the simulated virtual environment. In another embodiment, the position and orientation of the capture entity's avatar relative to another capture entity's avatar in the simulated virtual environment 118 can be offset by a predefined value compared to the position and orientation of the capture entity relative to the other capture entity in the capture volume 102. For example, if capture entity A is to the left of capture entity B in the capture volume, then in the simulated virtual environment, capture entity A's avatar is to the right of capture entity B's avatar. In another example, capture entity A's avatar is on a hill and capture entity B's avatar is at ground level.

In one embodiment, Operation 1 in FIG. 1 illustrates a capture entity 106 preparing to participate in a simulation. In one embodiment, to participate in such a simulation, a capture entity 106 such as a participant (e.g., living being) can don a wearable computing device 114. The peripherals of the wearable computing device 114 can include, but are not limited to the HMD 112, a microphone, a set of headphones and/or a computing device capable of transmitting, receiving and/or processing data. Further, the participant (e.g., living being) can be outfitted with a wearable gear (e.g., clothing, equipment, etc). In one embodiment, the wearable gear may be attached with retro reflective markers 110 and/or other items that support the motion capture simulation system 100 tracking the participant's movement. In one embodiment, if the capture entity 106 includes equipment associated with the participant and/or any other object, the markers 110 can be attached directly to the equipment and/or object.

In one embodiment, after suiting up, the participant can be registered as a capture entity 106 with the simulator engine. In another embodiment, the equipment associated with the participant can be registered as a capture entity 102. In one embodiment, any object in the capture volume can be registered as a capture entity 106. The operation of registering as a capture entity 106 can include creating an avatar of the capture entity 106 in the simulated virtual environment 118. Further registering as a capture entity 106 can include establishing an association between the capture entity's wearable computing device 114 and the capture entity's avatar 116.

After being registered, the capture entity 106 is now free to join other capture entities in the simulated scenario. While in the capture volume, the motion capture simulation system 100 can determine the position and actions (e.g., motion data) of the capture entities. Using the motion data, the simulator engine 402 can integrate the capture entity 106 into the simulated virtual environment 118 by driving the behavior of the capture entity's avatar in the simulated virtual environment 118 using the captured behavior (e.g., motion data) of the capture entity 106. Further, the capture entity avatar's view of the simulated virtual environment can be nearly simultaneously displayed in the capture entity's head-mounted display. The capture entity 106 can explore the simulated virtual environment and/or participate in the simulated events in the simulation scenario. In one embodiment, upon completion of the simulation scenario, the simulation can be optionally replayed for training or other purposes, as illustrated by operation 4 of FIG. 1. The sensory immersive motion capture simulation system is described in greater detail below, in association with FIG. 2.

Figure 2:
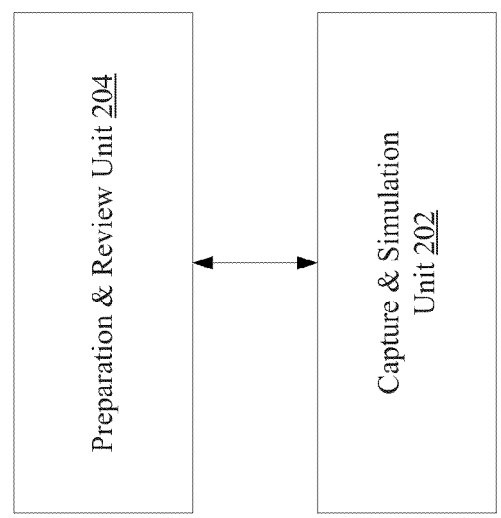
FIG. 2 illustrates a block diagram of the motion capture simulation system of FIG. 1, according to certain exemplary embodiments of the present invention.

Referring now to FIG. 1 and FIG. 2, FIG. 2 illustrates a block diagram of the motion capture simulation system of FIG. 1, according to certain exemplary embodiments of the present invention. In particular, FIG. 2 illustrates a preparation and review unit 204 and a capture and simulation unit 202.

In one embodiment, the capture and simulation unit 202 can be used to capture the movements and/or actions of the capture entity 106. In one embodiment, using the motion capture device 104 of the capture and simulation unit 202, the movements and actions of the capture entity 106 can be captured through taking images of the capture volume 102 that includes the capture entity. In another embodiment, the movement and actions of the capture entity 106 can be captured through continuously recording the capture volume 102 that includes the capture entity 106. Using the captured images/recording, the capture and simulation unit 202 can determine 3D motion data (e.g., position, orientation, velocity, etc.) of the capture entity 106 in the capture volume 102. The capture and simulation unit 202 can translate the 3D motion data of the capture entity 106 to a 3D motion data of the capture entity's avatar in the simulated virtual environment 118. In one embodiment, the capture and simulation unit 202 can drive the movements and actions of the capture entity's avatar 116 in the simulated virtual environment 118 based on the captured movements and actions of the capture entity 106 in the capture volume.

In one embodiment, the capture and simulation unit 202 can be used to generate a virtual character in the simulated virtual environment 118. Further, the capture and simulation unit 202 can be used to drive interactions between objects and avatars and/or avatars and virtual characters in the simulated virtual environment 118. In one embodiment, the capture and simulation unit 202 can drive the progression of events in the simulated virtual environment 118 based on the 3D motion data (e.g., position, orientation, velocity, etc.) of the capture entity 106. In one embodiment, the capture and simulation unit 202 can provide a visual, auditory, tactile, and/or olfactory feedback to the participant (e.g., capture entity 106) in near real time. The visual, auditory, tactile, and/or olfactory feedback can provide a sensory immersion experience to the participant (e.g., capture entity 106).

In one embodiment, the preparation and review unit 204 can be used to prepare a simulation environment. Preparing the simulation environment can include personalizing a capture entity 106. Personalizing a capture entity 106 can include matching the capture entity's avatar 116 with the physical attributes of the capture entity 106, such as matching the height of the avatar with that of the participant. Another example includes matching a shape of virtual representation of a weapon (e.g., avatar of weapon) with that of a weapon in the capture volume that is being motion captured. In addition, personalizing the capture entity 106 can include registering the capture entity 106 with the sensory immersion motion capture simulation system 100. Further, preparing the simulation environment can include loading a virtual environment (e.g., virtual world) based on the simulation. In one embodiment, a simulation scenario can be recorded live as the simulation is occurring using the preparation and review unit 204. In another embodiment, using the preparation and review unit 204, the simulation scenario can be stored once the simulation is over. For example, a simulation scenario could be a training scenario where the participants perform combat training in a simulated village environment. The simulation scenario can be stored after the participants finish the combat training or it can be stored as the combat training progresses. In one embodiment, the preparation and review unit 204 can facilitate a user replaying a stored (e.g., recorded) simulation scenario. In one embodiment, the stored simulation scenario may be replayed for training and/or other purposes.

In one embodiment, the capture and simulation unit 202 can be communicatively coupled to the preparation and review unit 204. In one embodiment, the capture and simulation unit 202 can communicate with the preparation and review unit 204 to load a virtual environment (e.g., virtual world such as jungle, urban city, etc.) that may be appropriate for a simulation. In another embodiment, the capture and simulation unit 202 can communicate with the preparation and review unit 204 to receive information including a list of the capture entities that have been registered with the motion capture simulation system 100. In a further embodiment, the capture and simulation unit 202 can communicate with the preparation and review unit 204 to store a simulation scenario for post simulation replay. In one embodiment, the capture and simulation unit 202 can transmit a 3D motion data (e.g., position, orientation, velocity, etc.) of the capture entity 106 to the preparation and review unit 204 for purposes of registration and/or personalization of the capture entity 106. The capture and simulation unit 202 and the preparation and review unit 204 are described in greater detail below, in association with FIG. 3 and FIG. 4.

Figure 3:
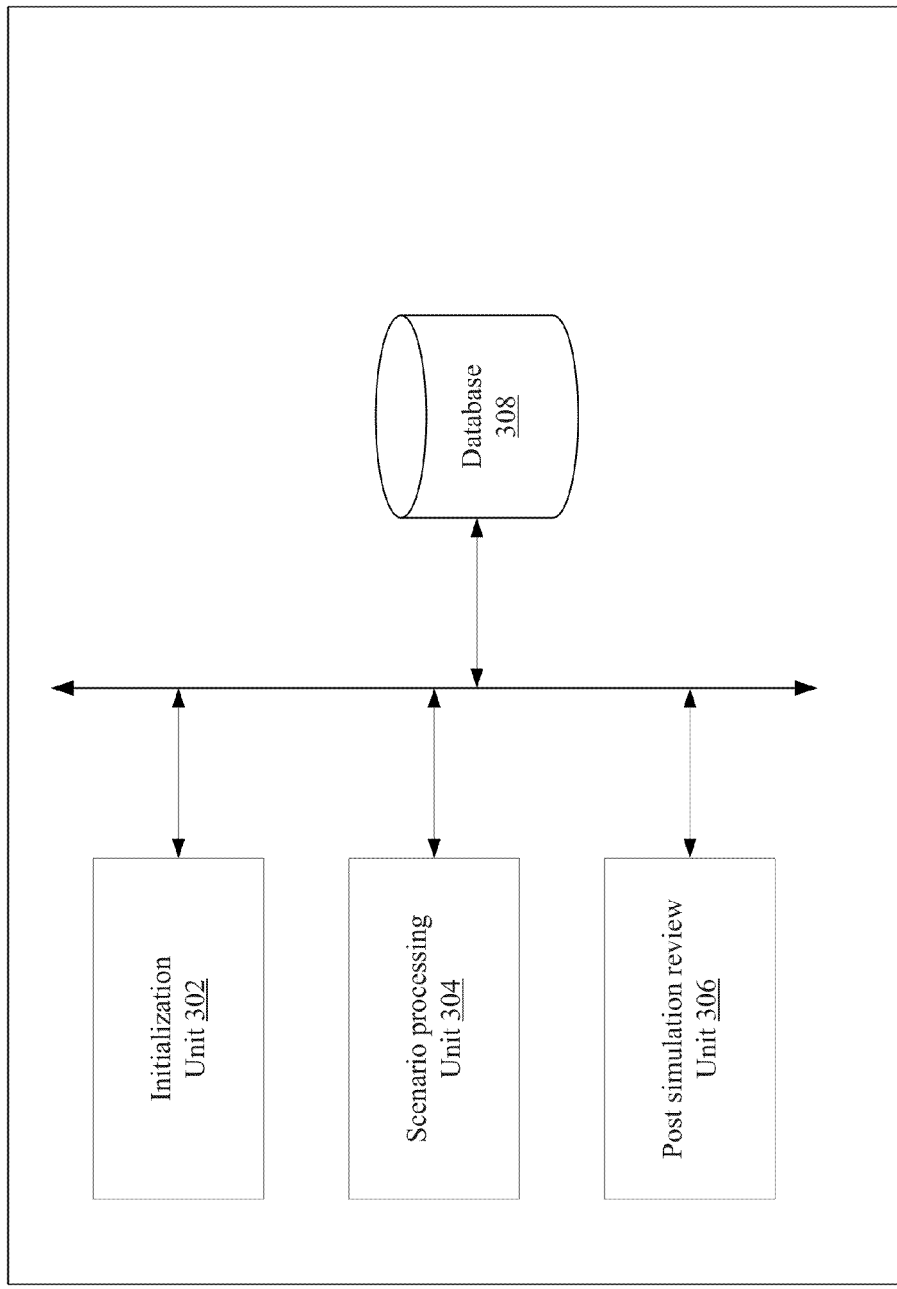
FIG. 3 illustrates a block diagram of the preparation and review unit of FIG. 2, according to certain exemplary embodiments of the present invention.

Now referring to FIG. 2 and FIG. 3, FIG. 3 illustrates a block diagram of the preparation and review unit of FIG. 2, according to certain exemplary embodiments of the present invention. In particular, FIG. 3 illustrates a initialization unit 302, a scenario processing unit 304, a post simulation review unit 306 and a database 308.

In one embodiment, the initialization unit 302 can include a data processing device such as a computer. In one embodiment, the data processing device can be a multi core processor device. In another embodiment, the data processing device can be combination of multiple single and/or multi-core processor devices communicatively connected via a network. Further, the initialization unit 302 can include a image capture device. In one embodiment, the initialization unit 302 can use the motion capture device 104 (shown in FIG. 4) of the capture and simulation unit 202 for purposes of capturing an image of the capture entity 106 (e.g., participant and/or an equipment associated with the participant). In one embodiment, the image of the capture entity 106 can be used for personalizing the capture entity 106. In one embodiment, personalizing the capture entity 106 can include matching a physical dimension of the capture entity 106 (e.g., participant) to the capture entity's avatar 116 in the simulated virtual environment 118. Further, personalizing a capture entity 106 (e.g., participant) can include associating a wearable computing device 114 to the capture entity 106.

In one embodiment, the initialization unit 302 can be at a remote location from the capture volume 102. For example, the operations of the initialization unit 302 are realized in a room that is separate from the capture volume 102. In another embodiment, the operations of the initialization unit 302 can be realized within the capture volume 102 such as when the initialization unit 302 uses the motion capture device 104 to capture an image of the capture entity 106.

In one embodiment, a participant (e.g., living being) dons a wearable gear and/or a wearable computing device 114. In one embodiment, the wearable computing device 114 can be a part of the wearable gear or vice versa. The wearable gear may include, inter alia a vest, an HMD, a microphone, and/or an earphone. In one embodiment, the wearable gear may be attached with retro reflective markers 110 to aid in tracking the capture entity 106. In the case of an equipment, the markers 110 can be attached directly to the equipment associated with the participant. In one embodiment, the markers on wearable gear can be used to track movement and action of any portion of the participant, such as head, body and/or legs. In one embodiment, the wearable gear may be a single wearable component that can be worn as one unit. In another embodiment, the wearable gear may be a combination of wearable components that can be worn separately.

In one embodiment, the initialization unit 302 can begin personalizing the participant (e.g., capture entity 106) by associating the participant (wearing the wearable gear and/or the wearable computing device 114) with an avatar having the physical dimensions of an average sized human being. The physical dimensions of the average size human being can be predefined. Once the participant (e.g., capture entity 106) is associated with the avatar, an image of the participant (e.g., capture entity 106) can be captured using an image capture device of the initialization unit 302. Using the data processing device, the initialization unit 302 can determine the marker positions of the wearable gear from the captured image of the participant (e.g., capture entity 106). The initialization unit 302 can process the marker positions using the data processing device to determine the actual physical dimensions of the participant (e.g., capture entity 106). In one embodiment, the initialization unit 302 can scale the dimensions of the avatar to match the actual physical dimensions of the participant (e.g., capture entity 106). Once the avatar is scaled, the initialization unit 302 can register the avatar as the participant's (e.g., capture entity 106) avatar 116. In one embodiment, the initialization unit 302 can register the participant (e.g., capture entity 106) as a capture entity 106, whereby when the participant (e.g., capture entity 106) enters the capture volume, the participant (e.g., capture entity 106) may be identified as the capture entity 106 by the motion capture simulation system 100. In one embodiment, the initialization unit 302 can associate the wearable computing device 114 of the participant to the participant (e.g., capture entity 106) and/or the participant's avatar. The initialization unit 302 can store the associations between the (e.g., capture entity 106) and the wearable computing device and/or the registration information in the database 308. In one embodiment, the initialization unit 302 can communicate the scaling information of the avatar and the registration of the participant (e.g., capture entity 106) and/or the participant's avatar 116 to the capture and simulation unit 202 for assisting with the operations of the capture and simulation unit 202.

In one embodiment, the scenario processing unit 304 can facilitate an operator (not shown in Figure) loading a virtual world based on a request from the capture and simulation unit 202. Further, the scenario processing unit 304 can be configured to import a virtual world (environment) from an online source. The scenario processing unit can include a data processing device capable of connecting to the Internet. The scenario processing unit 304 can store the imported scenarios in the database 308. In one embodiment, the capture and simulation unit 202 can access the virtual world directly from the database 308. In another embodiment, the scenario processing unit can retrieve the virtual world and communicate it to the capture and simulation unit 202. In one embodiment, the scenario processing unit 304 can support an operator editing appropriate features of the virtual world. The operator can add, remove or modify elements of the virtual world. In one embodiment, the scenario creation unit 304 can be configured to generate a number of virtual characters automatically. In another embodiment, using the scenario creation unit 304, an operator can create virtual characters. In one embodiment, an operator may create a virtual world using the scenario processing unit 304. The scenario processing unit 304 can include a user interface through which the operator can interact with the scenario processing unit 304.

In one embodiment, the post simulation review unit 306 can include a data processing device such as computer, a display device and/or audio output device. In one embodiment, the capture and simulation unit 202 can store the recorded simulation scenario in the database 308. Using the post simulation review unit 306, a user can load a recorded simulation scenario from the database 308. The operator can further play the recorded simulation scenario for training and/or other purposes. The capture and simulation unit 202 is described in greater detail below, in association with FIG. 4.

Now referring to FIG. 2 and FIG. 4, FIG. 4 illustrates a block diagram of the capture and simulation unit of FIG. 2, according to certain exemplary embodiments of the present invention. In particular, FIG. 4 illustrates a tracking device 408, a simulator engine 402, a motion capture device 104, a wearable computing device 114 and/or a viewer device 410.

In one embodiment, the motion capture device 104 can be a high speed camera. The motion capture device 104 can include a processor to process an image captured using the motion capture device 104. In one embodiment, the motion capture simulation system 100 can use one or more motion capture devices to capture information about the locations of the markers (or the location of the subject in a markerless embodiment) as the capture entity moves. The motion capture device 104 can support high-speed image capture, as well as high-speed image processing. Each motion capture device 104 of the one or more motion capture devices may be connected to each other, as well as to a tracking device 408.

In an example embodiment, the one or more motion capture devices 104 are placed around the capture volume 102. The one or more motion capture devices 104 can be synchronized so that their shutters (which may be electronic rather than mechanical) open simultaneously. In one embodiment, the motion capture devices 104 can be synchronized by an external source. In another embodiment, the motion capture devices 104 can be synchronized based on an internal clock within each motion capture device 104. In an example embodiment, each motion capture device 104 may include an number of light emitters such as LEDs along the periphery of each of the motion capture device 104. During motion capture the LEDs may be turned on. The light from the LEDs may be reflected back from the retro reflective markers 110 attached to the wearable gear donned by the capture entity 106 and/or the retro reflective markers 110 attached to the equipment (e.g., weapon) associated with the capture entity 106. The captured image may include locations where the reflected LED light ray may have intersected the image sensor. The locations where the reflected LED light ray may have intersected the image sensor, as well as other characteristics are used to determine the locations of the markers.

Each motion capture device 106 determines coordinates for each marker that it sees. As the subject moves, the cameras capture the motion and provide marker data, which describes the location of the markers in the 3D space. In one embodiment, the location of the markers can be used to determine the 3D motion data of the capture entity 106.

In one embodiment, the tracking device can determine the 3D motion data (e.g., position, orientation, velocity, etc.) of the capture entity 106. In one embodiment, the tracking device 408 can send the 3D motion data (e.g., position, orientation, velocity, etc.) of the capture entity 106 to the simulator engine 402. In another embodiment, the tracking device 408 can send the 3D motion data (e.g., position, orientation, velocity, etc.) of the capture entity 106 to the wearable computing device 114 of the capture entity 106. If there are a number of capture entities, then the tracking device 408 can select which capture entity's 3D motion data (e.g., position, orientation, velocity, etc.) is to be sent to the wearable computing device 114. For example, if a capture volume 102 includes capture entity A and capture entity B, then the tracking device 408 can choose to send the 3D motion data (e.g., position, orientation, velocity, etc.) of both capture entities A and B to the simulator engine 402. The 3D motion data (e.g., position, orientation, velocity, etc.) of capture entity A can be sent to the wearable computing device 114 of capture entity A. The 3D motion data (e.g., position, orientation, velocity, etc.) of capture entity B can be sent to the wearable computing device 114 of capture entity B. In one embodiment, the operations of the tracking device 408 can be performed by the motion capture device 104. In one embodiment, the 3D motion data may be determined by the motion capture device 104 and the motion capture device 104 may transmit the 3D motion data directly to the simulator engine 402. In another embodiment, the 3D motion data can be directly transmitted to the wearable computing device 114 from the motion capture device 104 and/or the tracking device 408.

In one embodiment, the simulator engine 402 can include a multi-core processor. In another embodiment, the simulator engine 402 can include a combination of multiple single and/or multi-core processors. In one embodiment, the simulator engine 402 can include a memory coupled to the processor. The memory may be non transitory storage medium, in one embodiment. The memory may include instructions. The processor may execute the instructions to perform operations that characterize the movements and actions of the capture entity 106 with high fidelity and nearly immediately and accurately translate the movements and actions of the capture entity 106 into corresponding movements and actions of the capture entity's avatar 116. In one embodiment, the simulator engine 402 can include one or more data processing devices such as computers mounted on a rack. The simulator engine 402 can include a user interface. An operator may access the simulator engine 402 through the user interface.

In one embodiment, the simulator engine 402 can receive the 3D motion data of the capture entity 106 from the tracking device 408. In another embodiment, the simulator engine 402 can receive the 3D motion data of the capture entity 106 from the motion capture device 104. In one embodiment, the simulator engine 402 can receive the 2D motion data of the capture entity 106 from the motion capture device 104. The simulator engine 402 can transform the 2D motion data from the motion capture device 104 to a 3D motion data of the capture entity 106. In one embodiment, the simulator engine 402 can receive a physiological data associated with the capture entity 106 from the wearable computing device 114 of the capture entity 106. The physiological data may be audio data, a tactile data, and/or olfactory data (e.g., heart rate, EKG, EMG, etc.)

Using the processor, the simulator engine can also process the audio data, tactile data, and/or olfactory data associated with the capture entity 106 (e.g., participant) to generate a feedback data for the capture entity 106 (e.g., participant). Further, using the processor, the simulator engine 402 can process the 3D motion data of the capture entity 106 to drive the capture entity's avatar 116 in the simulated virtual environment 118. In addition, the simulator engine 402 can drive the interaction of the capture entity's avatar 116 with the virtual characters in the simulated virtual environment 118. The simulator engine 402 can also drive the interaction of the capture entity's avatar 116 with the objects in the simulated virtual environment 118. The simulator engine 402 can control the interaction and/or behavior of the virtual character based on an artificial intelligence logic algorithm.

In one embodiment, the interactions of the virtual character, the capture entity's avatar 116 and/or the objects in the simulated virtual environment 118 can create sensory effects such as an audio effect (e.g., sound of an character walking in the simulated environment, sound of a shooting a gun in the simulated environment, the sound of a capture entity's avatar talking in the simulated environment, sound of a virtual character hitting against a prop in the simulated environment, sound generated by a vehicle in the simulated environment, etc.), a visual effect (e.g., shadows of characters changing as they walk based on the position of the character in the simulated environment, bleeding responsive to getting shot at, etc.) and/or a physiological effect (e.g., vibrations, electrical stimulation, etc.) The simulator engine 402 can transmit the various sensory effects, as auditory data, visual data, tactile data and/or olfactory data, to the wearable computing device 114 of the capture entity 106.

In one embodiment, the simulator engine 402 can periodically update the 3D motion data (e.g., position, orientation, velocity, etc.) of the capture entity's avatar 116, the 3D motion data (e.g., position, orientation, velocity, etc.) of the virtual character and/or the objects in the simulated virtual environment. In an example embodiment, the simulated virtual environment 118 is updated based on a frame rate at which the simulation is played, such as 60 frames per second. The frame rate can be variable. In one embodiment, the simulator engine 402 can transmit the updated 3D motion data (e.g., position, orientation, velocity, etc.) of the capture entity's avatar 116, the 3D motion data (e.g., position, orientation, velocity, etc.) the virtual character and the objects in the simulated virtual environment 118 to the wearable computing device 114 of the capture entity 106. In one embodiment, the simulator engine 402 can transmit the updated data through individually sending the updated data to a specific wearable computing device 114 of the capture entity. In another embodiment, if there are one or more capture entities, the simulator engine 402 can transmit the updated data by broadcasting the updated data. The updated data can include the 3D motion data (e.g., position, orientation, velocity, etc.) of the capture entity's avatar 116, the 3D motion data (e.g., position, orientation, velocity, etc.) the virtual character, the 3D motion data (e.g., position, orientation, velocity, etc.) of objects in the simulated virtual environment 118 and/or a simulation scenario data to the wearable computing device 114. Further the simulator engine 402 can transmit audio data, a visual data, a tactile data and/or an olfactory data to the wearable computing device 114 of the capture entity 106. The simulator engine 402 can be communicatively coupled to the wearable computing device 114.

In one embodiment, the wearable computing device 114 can receive the updated data from the simulator engine 402. Further, the wearable computing device 114 of the capture entity 106 (e.g., participant) can receive the audio data, the visual data, the tactile data and/or the olfactory data from the simulator engine 402. The wearable computing device can customize the data to the perspective of the capture entity 106 (e.g., participant) associated with the wearable computing device 114.

In one embodiment, the visual data can be provided to an HMD 112 worn by the capture entity 106. The visual data can drive a 1st person stereoscopic POV display provided for the capture entity 106 via an HMD 112. The audio data can be managed by providing a surround-sound effect through individual headphones and/or a general multi-speaker sound system. Tactile and olfactory data can be provided through a respective devices associated with the capture entity 106. The wearable computing device 114 of the capture entity 106 (e.g., participant) can use the audio data, the visual data, the tactile data and/or the olfactory data to provide an immediate and tactile experience drawing the capture entity 106 into a belief that the experience is real (e.g., sensory immersive experience).

In one embodiment, the wearable computing device can include a microphone. The wearable computing device 114 can capture a sound (or speech) of capture entity 106 (e.g., participant) through a microphone coupled to the capture entity 106. Further, the wearable computing device 114 can sample the sound. In one embodiment, the wearable computing device 114 can transmit the sampled sound to the simulator engine 402. In some embodiments, the wearable computing device 114 can process the captured sound to recognize a speech. In one embodiment, the wearable computing device 114 can transmit the processed sound and/or the recognized speech to the simulator engine 402.

In one embodiment, the simulator engine can transmit a simulation scenario to a display device 410. The simulation scenario can include the simulated virtual environment 118, the updated 3D motion data of all the objects, the virtual character, the capture entity's avatar, the audio data, the visual data, the tactile data and/or the olfactory data. In one embodiment, the simulation scenario can be transmitted as a video data. The display device 410 can process the video data and/or the simulation scenario to display the simulation to an external user. The external user can view the simulation scenario as and when the simulation is in progress, such as when the capture entities are performing actions in the capture volume for the simulation. The display device 410 can include, inter alia a TV, a computer, a monitor, a LCD display, LED display and/or smart display. In one embodiment, the display device 410 can receive simulation scenario and/or the video data from the wearable computing device 114. In one embodiment, the display device 410 can display the simulation from different perspectives, such as from the perspective of a trainer and/or a participant. In one embodiment, the different perspectives may be displayed through a partitioned view over a single display interface such that an external user need not use multiple display devices to view the simulation from each perspective. In an alternate embodiment, the display device can include one or more display interfaces that are connected to each other.

Figure 5:
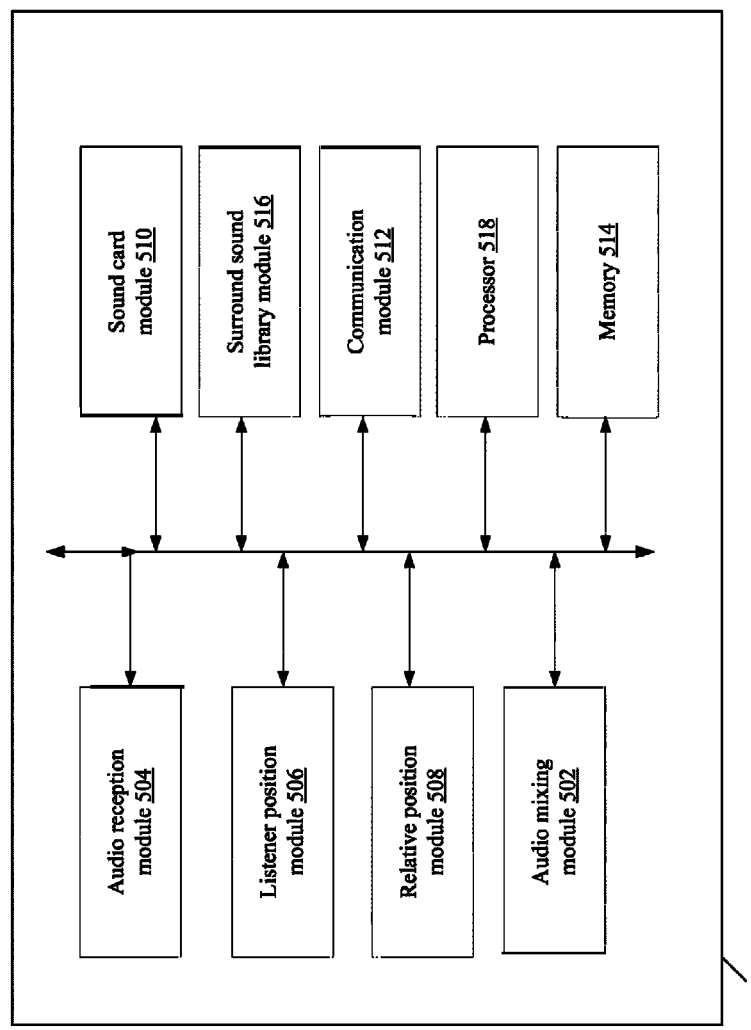
FIG. 5 illustrates a block diagram of the wearable computing device 114, according to certain exemplary embodiments of the present invention.

Now refer to FIG. 1, FIG. 4 and FIG. 5. FIG. 5 illustrates a block diagram of the wearable computing device 114, according to certain exemplary embodiments of the present invention. In particular, FIG. 5 illustrates an audio reception module 504, a listener position module 506, a relative position module 508, an audio mixing module 502, a sound card module 510, a surround sound library module 516, a communication module 512, a processor 518, a memory 514.

After an initialization process (described in connection with FIG. 1 and FIG. 3), the capture entity 106 can enter a capture volume 102 to participate in the motion capture based simulation. In one embodiment, the capture volume 102 can include one or more capture entities. The one or more capture entities can include a first entity and a second entity. In another embodiment, the capture volume 102 can include the first entity, but the second entity may be a virtual character in the simulated virtual environment 118. Hereinafter, the first entity is referred to as listener entity and the second entity is referred to as sound emitter entity. The sound emitter entity can be any inanimate and/or animate object that may generate speech, sound-effects and/or any other audible cue in the capture volume 102 and/or the simulation. In one embodiment, the sound emitter entity can be a capture entity 106 in the capture volume 102, such as a participant or an inanimate object. In another embodiment, the sound emitter entity can be a virtual character. The listener entity can be any user (e.g., participant) of the simulation who is fed with an appropriate mix of sounds that are currently playing in the capture volume and/or simulated virtual environment. The sounds that are currently playing may be generated by the sound emitter entity and/or other objects in the capture entity or the simulated virtual environment. The listener entity can be a capture entity 106 in the capture volume 102, such as a participant. In some embodiments, the sound emitter entity and the listener entity can be the same entity, such as a participant that generates the sound can also be the participant that listens to the sound that the participant generates. For example, when a participant walks, a sound of the participant's footsteps may be fed to the participant to provide a sensory immersive experience and thereby reducing a suspension of disbelief barrier of the participant.

The sound generated by a participant in a capture volume 102 can be processed by the wearable computing device of the participant to translate the sound to a sound of the virtual representation of the participant in the simulated virtual environment 118. The translated sound is customized to the perspective of the participant. Further, the translated sound is played back to the participant through surround sound speakers associated with the wearable computing device of the participant.

Even though the Figures are described from the perspective of one sound emitter entity and one listener entity, one of ordinary skill in the art can understand and appreciate that the system, device and/or method can be operable with one or more sound emitter entities and listener entities.

In one embodiment, the sound emitter entity can be a living being in a capture volume 102, such as a human being in the capture volume 102. The sound emitter entity can trigger an audio event, such as a human being walking can generate a sound (e.g., sound of foot against the ground). In another embodiment, the sound emitter entity can be a physical and/or mechanical body associated with the living being in the capture volume 102, such as a weapon carried by the human being. In the embodiment that the sound emitter entity is a physical and/or mechanical body associated with the living being, the living being can cause an audio event using the sound emitter entity, such as a human being shooting a weapon to generate a gun shot noise. Triggering the audio event in the capture volume 102 can nearly simultaneously trigger the audio event in the simulated virtual environment. Examples of audio events are sound effects such as gun shots, clapping hands, collision with a prop, walking, etc. Another example of an audio event is speech, audible cue in the simulation, etc.

In a further embodiment, the sound emitter entity can be a virtual character in a simulated virtual environment 118. The virtual character can trigger an audio event in the simulated virtual environment 118. In some embodiments, the sound emitter entity can be a sound generating virtual body in the simulated virtual environment, such as a vehicle in the simulated virtual environment 118.

In one embodiment, a capture volume can include a sound emitter entity and a listener entity. The sound emitter entity can trigger an audio event. The motion capture device 104 can capture the image of the capture volume including the sound emitter entity and the listener entity. The motion capture device sends the image to the tracking device 408. The tracking device 408 can determine that the sound emitter entity has triggered the audio event based on the image received from the motion capture device 104. Further the tracking device can determine the 3D motion data (e.g., position, orientation and/or velocity of motion) of the sound emitter entity and/or the listener entity. The tracking device 408 can inform the simulator engine 402 that the audio event has been triggered. Further, the tracking device can transmit the 3D motion data (e.g., position, orientation and velocity of motion) of the sound emitter entity and/or the listener entity to the simulator engine 402.

The simulator engine can receive the information that the audio event has been triggered and/or the 3D motion data of the sound emitter entity and/or the listener entity. In one example embodiment, when an audio event is an event of a living being (e.g., participant) triggering a gun to fire the gun in the capture volume, the 3D motion data of the sound emitter entity can include a position, orientation and/or velocity of motion of both the living being (e.g., participant) and the gun. In the said example embodiment, the capture entity 106 can include both the living being and the gun. In one embodiment, the position, orientation and/or velocity of motion of the living being can include the position, orientation and/or velocity of motion of the living beings head. In another embodiment, the position, orientation and/or velocity of motion of the living being can include the position, orientation and/or velocity of motion of any motion captured parts of the living being. In another example embodiment, when an audio event is an event of a living being talking, then the 3D motion data of the sound emitter entity can include a position, orientation and/or velocity of motion of both the living being.

Using the 3D motion data of the sound emitter entity, the simulator engine 402 can update the position and orientation of the sound emitter entity's avatar in the simulated virtual environment 118. Using the 3D motion data of the listener entity, the simulator engine 402 can update the position and orientation of the listener entity's avatar in the simulated virtual environment 118. In one embodiment, using the 3D motion data of the sound emitter entity and/or the listener entity, the simulator engine 402 can update the position, orientation and velocity of motion of any object including virtual characters in the simulated virtual environment 118 that are affected by the 3D motion data of the sound emitter entity and/or the listener entity. In another embodiment, the position and orientation of the virtual characters can be updated based on an artificial intelligence logic algorithm. Further, using the 3D motion data of the sound emitter entity and/or the listener entity, the simulator engine 402 can calculate the position and orientation of the listener entity's avatar relative to the position and orientation of the sound emitter entity's avatar. In one embodiment, the simulator engine 402 can generate a vector between the coordinates representing the position and orientation of the listener entity's avatar and the coordinates representing the position and orientation of the sound emitter entity's avatar. The vector can be used to determine the distance between the sound emitter entity's avatar and the listener entity's avatar. Further the vector can be used to determine a position and orientation of the sound emitter entity's avatar relative to the listener entity's avatar.

In one embodiment, the simulator engine 402 can determine a characteristic of the audio event based on the information from the tracking device 408 that the audio event has been triggered by the sound emitter entity. Characteristic of an audio event can define the type of the audio event. For example, a tracking engine sends information that shows two flashing LEDs on a weapon captured through motion capture and the simulator engine determines that the flashing LEDs on a weapon means that the weapon is fired. In response to determining the characteristic of the audio event, the simulator engine 402 can update a state of any object including the sound emitter entity's avatar and the listener entity's avatar in the simulated virtual environment 118 that is affected by the audio event. Updating the state of an object in the simulated virtual environment 118 based on the audio event can include introducing any effects in the simulated virtual environment 118 associated with the audio event. The effect can be an audio effect such as a sound. Further, the simulator engine 402 can generate an audio data associated with the audio event responsive to determining the characteristic of the audio event. The audio data can include, but not limited to a state change identifier and an event identifier. The event identifier can be used to determine the audio file associated with the audio event. The state change identifier can be used to determine a mode of processing the audio file (e.g., if and how the audio file is to be processed). The mode of processing the audio file can include, but not limited to playing the audio file, stop playing the audio file and/or continue playing the audio file. If the audio file is currently being processed the state change identifier can be used to determine if the processing is to be stopped or continued.

In one embodiment, each audio event can have a corresponding sound associated with the audio event. The sound corresponding to the audio event can be unique to the sound emitter entity associated with the audio event. For example, sound associated with one user walking is different from another user and the sound of a gun shot from a machine gun is different from the sound of a gun shot from a pistol. Further, in the example the sound of a gun shot (audio event 1) is different from sound of the user walking (audio event 2). Each sound can be unique to an audio event and the sound emitter entity associated with the audio event. In one embodiment, the sound associated with audio event that is triggered by the sound emitter entity can be prerecorded and stored as audio files. In one embodiment, the audio files may be stored in a memory 514 of the wearable computing device 114. The audio file can include a sound associated with audio event that is triggered by the sound emitter entity and one or more attributes associated with the audio file. The attributes associated with the audio file are decibel level, sound attenuation fall-off distance, relative mix level, or other values useful to the 3d sound library in describing the intrinsic auditory properties of the sounds emitted by the sound emitter entity.

Triggering the audio event can produce a corresponding sound in the simulated virtual environment 118. In one embodiment, prior to the simulation, each sound emitter entity can be associated with various audio events that pertain to the sound emitter entity. In another embodiment, the sound emitter entity can be associated with various audio events during the initialization process (initialization operation is described in association with FIG. 1 and FIG. 3). In one embodiment, when the sound emitter entity is a virtual character, the simulator engine 402 can define the sound corresponding to the audio event. In one embodiment, the sound associated with the virtual character can be defined based on an artificial intelligence logic algorithm. The sound associated with the virtual characters can be recorded on an audio file that can be stored in the memory 514 of the wearable computing device.

The simulator engine 402 can transmit the audio data to the wearable computing device 114 of the listener entity. In one embodiment, the simulator engine 402 can transmit 3D motion data of all the objects in the simulated virtual environment 118. In another embodiment, the simulated engine 402 can transmit 3D motion data of objects in the simulated virtual environment 118 that are affected by the audio event. In yet another embodiment, the simulator engine 402 can transmit the 3D motion data of the sound emitter entity's avatar, the listener entity's avatar and/or the listener entity in the capture volume to the wearable computing device 118. In one embodiment, the simulator engine 402 can transmit information associated with the calculated vector to the wearable computing device 114 of the listener entity. The simulator engine 402 can be communicatively coupled to the wearable communication device 114 of the listener entity over a network. In one embodiment, data in the described embodiments can be transmitted as separate packets. In another embodiment, the data may be combined to form a single packet and transmitted as a single packet.

The wearable computing device 114 of the listener entity can receive the audio data using the audio reception module 504. Further, the wearable computing device 114 of the listener entity can receive the 3D motion data of the listener entity and/or the listener entity's avatar using the listener position module 506. The wearable computing device 114 of the listener entity can receive the 3D motion data of the sound emitter entity's avatar using the relative position module 508. In one embodiment, the audio reception module 504, the listener position module 506 and the relative position module 508 can operate as one unit. In one embodiment, the audio reception module 504, the listener position module 506 and the relative position module 508 can be replaced by one module.

Further, the wearable computing device 114 of the listener entity can process the audio data, the motion data of the listener entity, listener entity's avatar and the motion data of the sound emitter entity's avatar to generate multi channel audio output data that is customized to the perspective of the listener entity. The multi channel audio output data can be generated using the audio mixing module 502. The multi channel audio output data is associated with the audio event. In one embodiment, the multi channel audio output data is a surround sound. The sound associated with the audio event can be processed based on the 3D motion data of the sound emitter entity's avatar, the 3D motion data of the listener entity in the capture volume and/or the 3D motion data of the listener entity's avatar, to give the surround sound effect.

In one embodiment, the audio mixing module 502 is configured to input the 3D motion data of the sound emitter entity's avatar and the 3D motion data of the listener entity to the surround sound library module 516 (hereinafter "sound library"). In another embodiment, the audio mixing module 502 can input the 3D motion data of the listener entity's avatar to the sound library 516. The sound library is described in greater detail below, in association with FIG. 6

Now refer to FIG. 5 and FIG. 6. FIG. 6 illustrates a block diagram of the audio mixing module, according to certain exemplary embodiments of the present invention. In particular FIG. 6, illustrates a motion update module 602 and position update module 604. In one embodiment, the motion update module 602 is configured to call a function (e.g., subroutine) of the sound library 516 (shown in FIG. 5) to update the 3D motion data of the sound emitter entity's avatar based on the inputted 3D motion data of the sound emitter entity's avatar. Further, the motion update module 602 is configured to call a function of the sound library 516 (shown in FIG. 5) to update a 3D motion data of the listener entity and/or the listener entity's avatar based on the inputted 3D motion data of the listener entity.

In one embodiment, the wearable computing device 114 can periodically receive the 3D motion data of the listener entity, listener entity's avatar and/or the sound emitter entity's avatar. The rate of periodically receiving the 3D motion data of the listener entity, listener entity's avatar and/or the sound emitter entity's avatar is determined by the capture rate of the motion capture device 104 and/or the refresh rate (frame rate) of the simulated virtual environment. The capture rate may be associated with the motion capture device 104 and the refresh rate may be associated with the simulator engine 402. In an example embodiment, the rate at which the wearable computing device 114 receives the 3D motion data and/or the audio data can be 60 times per second. In another embodiment, the refresh rate and/or capture rate can be variable. In one embodiment, the capture rate and the refresh rate can be different. In another embodiment, the capture rate and the refresh rate can be the equal. The 3D motion data of the listener entity, listener entity's avatar and/or the sound emitter entity can be updated at the sound library each time the wearable computing device receives the said data to replace the 3D motion data of a previous simulation frame. The audio data can be updated similarly.

Now refer back to FIG. 5. Using the processor 518, the sound library 516 can calculate the distance between the avatars of the listener entity and the sound emitter entity in the simulated virtual environment 118. Further, using the processor 518, the sound library 516 can calculate the direction of the sound emitter entity's avatar in reference to the listener entity's avatar. The sound library 516 can calculate the direction and distance based on the updated 3D motion data of the listener entity, listener entity's avatar and/or the sound emitter entity's avatar. In an alternate embodiment, the simulator engine 402 can calculate the distance and direction and transmit the direction and distance to the wearable computing device 114 of the listener entity.

Further, the sound library 516 can input the audio data to the sound library 516. In one embodiment, the audio mixing module 502 can retrieve an audio file associated with audio event based on an event identifier included in the audio data. The audio file can be retrieved from the memory 514 of the wearable computing device 114. In another embodiment, the audio file can be retrieved from a memory external to the wearable computing device. In one embodiment, the memory can be volatile memory. In another embodiment, the memory can be a non-volatile memory. Further, using the state change identifier, the audio mixing module 502 can call an appropriate function of the sound library 516 to process the audio file. In one embodiment, processing the audio file can include playing a sound stored (e.g., encoded) in the audio file. In another embodiment, when the sound is playing, processing the audio file can include stop playing a sound. Further, the sound can incorporate all the audio attributes associated with the sound that are stored along with the sound in the audio file. The audio attributes may be associated with the audio event. The audio attributes may vary based on the audio event.

Using the processor 518, the sound library 516 can customize the audio file to the perspective of the listener entity. The audio file can be customized based on the updated 3D motion data of the listener entity, listener entity's avatar, the sound emitter entity's avatar, the distance between the listener entity's avatar and the sound emitter entity's avatar and/or the direction of the sound emitter entity's avatar. Further, the audio file is customized to provide a surround sound effect to the listener entity. Customizing the audio file can include setting the volume level for each sound based on attenuation by distance, and/or mix the sounds appropriately in each of the surround sound speakers (e.g., headphones, loudspeakers, etc.) to reflect the proper position and orientation of each sound being emitted with respect to the listener entity's head location. This will result in the listener entity hearing the sounds of the simulation through surround-sound headphones with the same audio cues as real life as it relates to the direction and distance of objects emitting sound. In one embodiment, the multi channel audio output data can be an audio file customized to the perspective of the listener entity with or without a surround sound effect. Further, using the communication module 512, the multi channel audio output data (e.g., customized audio file) is communicated to the listener entity via a surround sound audio output device, such as a surround sound headphone.

In an example embodiment, if the simulation is of a sound emitter entity firing a firearm (such as a rifle) and the position and orientation of the firearm is determined from tracking a model of the firearm, the sound of the firearm being fired can be played when the participant pulls the trigger. At such time, the motion capture derived position and orientation of the model firearm can be used as inputs to the sound library 516 when spatial relationships and attenuation is calculated. In another example embodiment, if the sound emitter entity can speak into a microphone as part of the simulation, the data from the microphone is streamed into the sound library 516 as a property of the sound emitter entity's avatar. At each time-slice of the simulation (e.g., each frame), when the position and orientation of the sound emitter entity's avatar is updated, the position of the participant's mouth can be computed using the real time motion capture data and can be used to update the position and direction of the sound using the sound library 516. In one example embodiment, as the simulation progresses and it is determined that the participant's avatar collides with or manipulates props or other objects in the scene, sounds associated with those collisions (e.g., sound of footsteps when the participant's feet touch the floor) may be played so that they sound as if they are emanating from the places they would in real life, using the sound library and the derived position and orientation of those parts of the participant's body that collided with or manipulated the objects.

In one embodiment, the sound emitter entity can be in a first capture volume and the listener entity can be in a second capture volume. The first capture volume and the second capture volume can be communicatively coupled through a network. In one embodiment, communicatively coupling a first capture volume and the second capture volume can refer to communicatively coupling the simulator engines of both the capture volumes. In another embodiment, both the capture volumes can have a single simulator system. Further, 3D motion data from the first capture volume and 3D motion data from the second capture volume can be used to drive actions and interactions of any object in the simulated virtual environment. Any object in the simulated virtual environment 118 can include the virtual representation of the of sound emitter entity, the virtual representation of the listener entity, the virtual character, any virtual inanimate body and/or props.

Figure 7A:
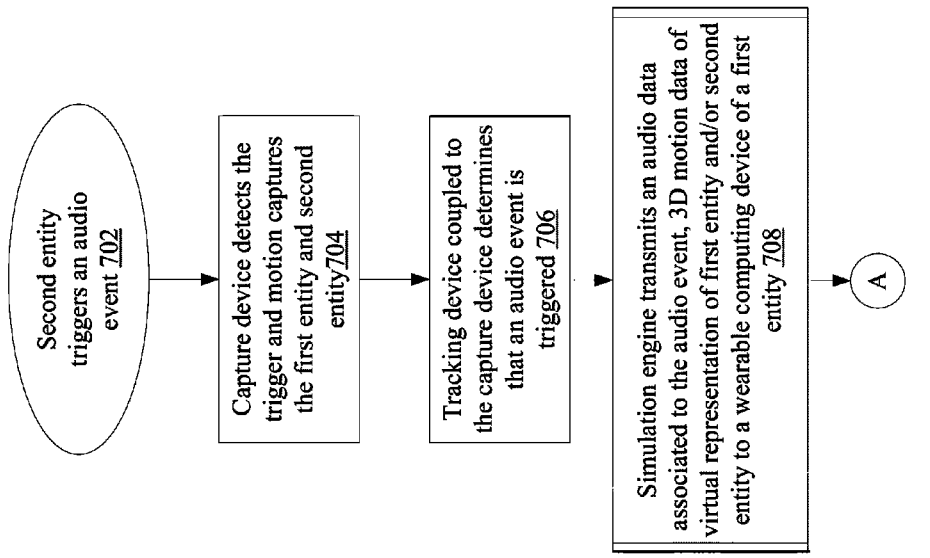
FIG. 7A illustrates a flow chart depicting a method of generating surround sound for a sensory immersive motion capture simulation system of FIG. 1, according to certain exemplary embodiments of the present invention.

Now refer to FIG. 1-4 and FIG. 7A. FIG. 7A illustrates a flow chart depicting a method of generating surround sound for a sensory immersive motion capture simulation system of FIG. 1, according to certain exemplary embodiments of the present invention. In operation 702, a sound emitter entity triggers an audio event. The audio event can include, but not limited to an event of a sound emitter entity firing a weapon, the sound emitter entity speaking, the sound emitter entity walking and other actions of the sound emitter entity that warrants the emission of a sound in a simulated virtual environment. The sound emitter entity can include any capture entity 106 in the capture volume 102 and/or a virtual character in the simulated virtual environment 118. The capture entity 106 in the capture volume 102 can include any object in the capture volume 102 that is motion captured, such as human being, equipment and/or a mechanical object. In one embodiment, the capture entity 106 in the capture volume 102 can be attached with highly reflective and light weight markers (e.g., retro reflective markers 110). In one embodiment, the markers may be attached to a wearable gear donned by the capture entity 106. In some embodiments, the markers may be attached directly to the capture entity 106, such as markers attached to a weapon that is to be motion captured. In another embodiment, the capture entity 106 can be without any markers (hereinafter "markerless"). In one embodiment, triggering an audio event can generate an optical cue. The optical cue can be used to determine that the audio event is triggered. For example, if a user fires a weapon (model of a weapon) in the capture volume, LED lights attached to the weapon may start flashing. The flashing LED lights provide an optical cue that the weapon is fired. In another embodiment, triggering the audio event can generate an electrical signal. The electrical signal can be used to determine that the audio event is triggered. In one embodiment, the motion of the sound emitter entity can act as a cue to determine that the audio event is triggered.

In operation 704, when the sound emitter entity is a capture entity 106 in the capture volume 102, the motion capture device 104 captures an image of the sound emitter entity triggering the audio event. The motion capture device 103 can use the image of the sound emitter entity triggering an audio event to determine a motion data of the sound emitter entity triggering the audio event. In one embodiment, the motion data of the sound emitter entity triggering the audio event can include a position, orientation and velocity of motion of a participant user's head (e.g., living being). In this embodiment, the participant user is a capture entity 106. In another embodiment, the motion data of the sound emitter entity triggering an audio event can include a position, orientation and velocity of motion of a participant entity's head (e.g., living being) and a position and orientation of a device (e.g., weapon, racket, wand, sword, etc.) held by the participant user. In this embodiment, the participant user and the device held by the participant user form the capture entity.

The motion capture device 104 can periodically capture an image of the capture volume 102 which may include the sound emitter entity. The motion capture device can be a high speed camera including a processor. The rate of capture can be determined by the shutter speed of the camera. In an alternate embodiment, the motion capture device can continuously record the capture volume which may include the sound emitter entity triggering the audio event. In one embodiment, an image of the capture volume and/or the recording of the capture volume can be done using one or more motion capture devices operating synchronously. The one or more motion capture devices can be connected together.

In addition, the motion capture device 104 captures the image of the listener entity. The motion capture device 104 can use the image of the listener entity to determine the motion data of the listener entity in the capture volume 102. In one embodiment, the capture volume may include the sound emitter entity and the listener entity.

In one embodiment, the motion capture device 104 can process the image/recording of the capture volume to determine the marker locations of the sound emitter entity and the listener entity in the image. The motion capture device 104 can associate the marker locations to the sound emitter entity and/or the listener entity. Using the determined marker locations and association of the marker locations with the sound emitter entity and the listener entity, the motion capture device 102 determines the motion data of the sound emitter entity triggering the audio event and the motion data of the listener entity. In one embodiment, the motion capture data determined by the motion capture device 104 can be a two dimensional motion data. In another embodiment, the motion capture device 104 can convert the two dimensional motion data to three dimensional (3D) motion data using additional motion data from other motion capture devices that capture the same capture volume synchronously.

In an alternate embodiment, when the sound emitter entity is a virtual character, the 3D motion data of the sound emitter entity, the 3D motion data of the sound emitter entity's avatar, the 3D motion data of the listener entity and/or the 3D motion data of the listener entity's avatar to the wearable computing device 114 of the listener entity is determined by the simulator engine 402.

In one embodiment, the motion capture device 104 can transmit the motion data of the sound emitter entity and the listener entity along with the respective identified marker locations to the tracking device 408, the simulator engine 402 and/or the wearable computing device 114 of the listener entity. Further, the motion capture device 104 can transmit any cue (e.g., optical cue) that indicates that the audio event is triggered.

In operation 706, the tracking device 408 determines that an audio event is triggered. The tracking device can determine that the audio event is triggered based on the motion data of the sound emitter entity and the listener entity along with the respective identified marker locations received from the motion capture device 104. If the motion data is two dimensional then the tracking device can convert the two dimensional motion data into a 3D motion data using motion data from each motion capture device of one or more motion capture devices that synchronously capture the image of the capture volume including the listener entity and the sound emitter entity. The tracking device 408 can analyze the motion data and/or the cue (e.g., optical cue) to determine that the audio event is triggered. In one embodiment, the motion capture device 104 may transmit the image of the capture volume and the tracking engine 408 can use the image to find the cue. In another embodiment, the motion capture device 104 can detect the cue and transmit the cue to the tracking device 408. The tracking device 408 can generate a signal encoded with the cue and transmit the signal to the simulator engine 402. Further, the tracking module 408 can transmit the 3D motion data of the sound emitter entity triggering the audio data and/or the listener entity to the simulator engine 402 and/or the wearable computing device 114 of the listener entity.

In operation 708, the simulator engine transmits an audio data associated with the audio event, the 3D motion data of the sound emitter entity's avatar, the 3D motion data of the listener entity and/or the 3D motion data of the listener entity's avatar to the wearable computing device 114 of the listener entity. Operation 708 includes additional operations that are described in greater detail below, in association with FIG. 10A and FIG. 10B.

Figure 10A:
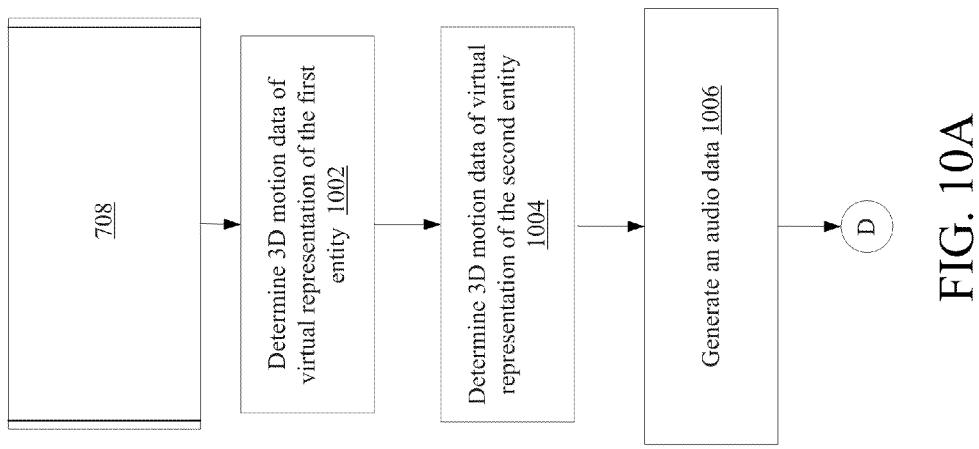
FIG. 10A illustrates a flow chart depicting the method of a simulator engine, according to certain exemplary embodiments of the present invention.

Now refer to FIG. 1-4 and FIG. 10A. FIG. 10A illustrates a flow chart depicting the method of a simulator engine, according to certain exemplary embodiments of the present invention. In operation 1002, the simulator engine 402 determines the 3D motion data of the sound emitter entity's avatar based on the 3D motion data of the sound emitter entity. Further, the simulator engine 402 updates the 3D motion data of the sound emitter entity's avatar in the simulated virtual environment 118. In one embodiment, when the sound emitter entity is a virtual character, the simulator engine determines the 3D motion data of the virtual character based on an artificial intelligence logic algorithm. In operation 1004, the simulator engine 402 determines the 3D motion data of the listener entity's avatar based on the 3D motion data of the listener entity. Further, the simulator engine 402 updates the 3D motion data of the listener entity's avatar in the simulated virtual environment 118.

In operation 1006, the simulator engine 402 generates an audio data responsive to determining a nature of the audio event. The simulator engine 402 can determine the nature of the audio event based on the cue associated with the audio event. For example, flashing LED lights indicate a nature of the audio event to be a gun shot, when the flashing LED lights stop it can indicate the nature of the audio event as the user stopped shooting. The cue associated with the audio event may be received from the tracking device 408. The audio data can include a state change identifier and an event identifier. The event identifier can be used to identify an audio file associated with the audio event. The audio file can include a sound that is specific to the audio event and the sound emitter entity that triggers the audio event. For example, sound of a machine gun when the audio event is firing a machine gun or sound of footsteps when the audio event is a participant walking in the capture volume which translates to the participant's avatar walking in the simulated virtual environment 118. In one embodiment, the audio file can include a sound and/or and audio attribute associated with the sound. The sound can be played and/or stopped based on the audio event. The audio event in the capture volume is translated to an audio event in the simulated virtual environment 118. The sound associated with the audio event is played and/or stopped playing in the simulated virtual environment. In some embodiments, a number of operations can be performed on the sound, such as fading effect, increasing volume, etc.

Now refer to FIG. 10B. FIG. 10B illustrates a continuation of the flow chart in FIG. 10A depicting the method of the simulator engine, according to certain exemplary embodiments of the present invention. In operation 1008, the simulator engine 402 transmits the 3D motion data of the listener entity to the wearable computing device 114 of the listener entity. In one embodiment, the simulator engine 402 transmits the 3D motion data of the listener entity's avatar and/or the 3D motion data of the listener entity to the wearable computing device 114 of the listener entity. The 3D motion data of the listener entity can include the 3D position, 3D orientation and velocity of motion of the listener entity's head and/or the head of the listener entity's avatar. In operation 1010, the simulator engine 402 transmits the 3D motion data of the sound emitter entity's avatar to the wearable computing device 114 of the listener entity. In operation 1012, the simulator engine 402 transmits the audio data associated with the audio event to the wearable computing device 114 of the listener entity.

Figure 7B:
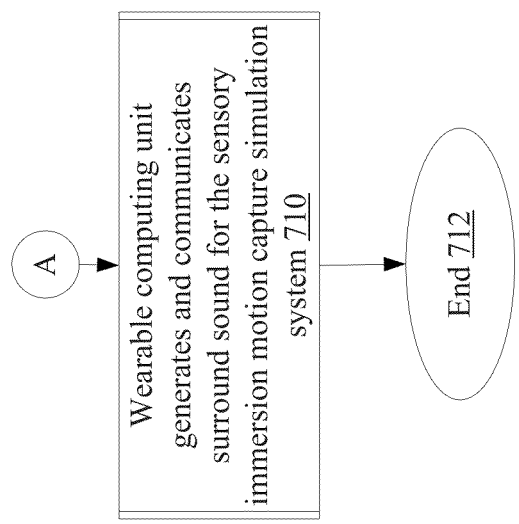
FIG. 7B illustrates a continuation of the flow chart in FIG. 7A depicting method of generating surround sound for a sensory immersive motion capture simulation system of FIG. 1, according to certain exemplary embodiments of the present invention.

Now refer back to FIG. 7A and FIG. 7B. FIG. 7B illustrates a continuation of the flow chart in FIG. 7A depicting method of generating surround sound for a sensory immersive motion capture simulation system of FIG. 1, according to certain exemplary embodiments of the present invention. In operation 710, the wearable computing device 114 of the listener entity generates a surround sound for a sensory immersive motion capture simulation system based on the audio data associated with the audio event, the 3D motion data of the sound emitter entity's avatar, the 3D motion data of the listener entity and/or the 3D motion data of the listener entity's avatar. In one embodiment, the audio data associated with the audio event, the 3D motion data of the sound emitter entity's avatar, the 3D motion data of the listener entity and/or the 3D motion data of the listener entity's avatar can be received from the simulator engine 402. Operation 710 includes additional operations that are described in greater detail below, in association with FIG. 8A and FIG. 8B.

Now refer to FIG. 1-7B and FIG. 8A. FIG. 8A illustrates a flow chart that depicts the method of a wearable computing device of the listener entity, according to certain exemplary embodiments of the present invention. In operation 802, the wearable computing device 114 of the listener entity receives audio data from the simulator engine. The audio data may be associated with the audio event. The wearable computing device 114 of the listener entity can receive the audio data using the audio reception module 504. The simulator engine 402 and the wearable computing device 114 of the listener entity in the capture volume 102 can be communicatively coupled. The wearable computing device 114 of the listener entity can receive the audio data over a wireless and/or wired communication link.

In an alternate embodiment, the audio data may be received directly from the sound emitter entity. In one embodiment, when the sound emitter entity is a participant, the wearable computing device 114 of the sound emitter entity can determine that the sound emitter entity has triggered the audio event. The wearable computing device 114 of the sound emitter entity can generate an audio data responsive to determining that the audio event is triggered. In one embodiment, if the audio event is an event of the participant talking, then the speech is captured using a microphone associated with the participant. The microphone can feed the captured speech to the wearable computing device 114 of the sound emitter entity. The sound card module 510 can sample the speech and send the sampled speech to a sound library 516. The sound library 516 of the wearable computing device 114 of the sound emitter entity can generate an audio data. The audio data may be transmitted directly to the wearable computing device 114 of the listener entity. In one embodiment, the audio data can be the sampled speech. Even though the wearable computing device of the sound emitter entity and the wearable computing device of the listener entity are referred to by component number 114, one of ordinary skill in the art would understood and appreciate that they could be different from each other.

In operation 804, the wearable computing device 114 of the listener entity receives 3D motion data of the listener entity and/or listener entity's avatar from the simulator engine 402. The wearable computing device 114 of the listener entity can receive the 3D motion data of the listener entity and/or listener entity's avatar using the listener position module 506. In one embodiment, the wearable computing device can receive the 3D motion data of the listener entity and/or listener entity's avatar from the motion capture device 104 and/or the tracking device 408.

In operation 806, the wearable computing device 114 of the listener entity receives 3D motion data of the sound emitter entity's avatar from the simulator engine 402. The wearable computing device 114 of the listener entity can receive the 3D motion data of the sound emitter entity's avatar using the relative position module 506. In one embodiment, the wearable computing device can receive the 3D motion data of the sound emitter entity's avatar from the motion capture device 104 and/or the tracking device 408.

Figure 8B:
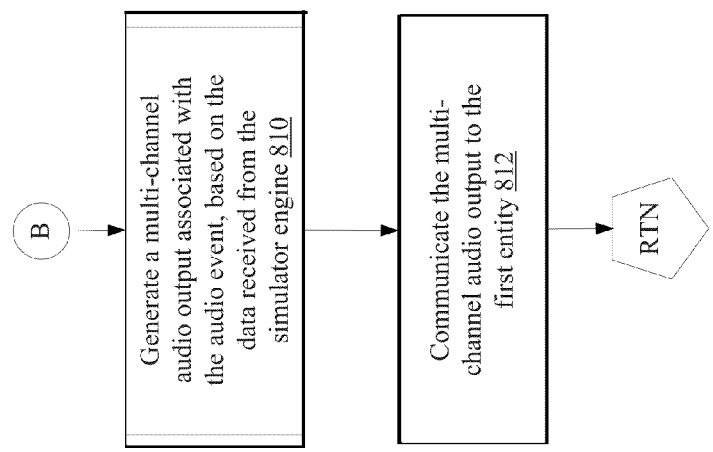
FIG. 8B illustrates a continuation of the flow chart shown in FIG. 8A, according to certain exemplary embodiments of the present invention.

Now refer to FIGS. 1-4, FIG. 7A, FIG. 7B, FIG. 8A and FIG. 8B. FIG. 8B illustrates a continuation of the flow chart shown in FIG. 8A, according to certain exemplary embodiments of the present invention. In operation 810, the wearable computing device 114 of the listener entity generates a multi channel audio output data that is customized to the perspective of the listener entity's avatar in the simulation environment 118 and/or the listener entity in the capture volume 102. The multi channel audio output data that is customized to the perspective of the listener entity's avatar can be associated with the audio event. The multi channel audio output data that is customized to the perspective of the listener entity's avatar can be generated based on the audio data associated with the audio event, the 3D motion data of the sound emitter entity's avatar, the 3D motion data of the listener entity and/or the 3D motion data of the listener entity's avatar. The multi channel audio output data can be generated using the audio mixing module 502. Operation 810 includes additional operations that are described in greater detail below, in association with FIG. 9A and FIG. 9B.

Figure 9A:
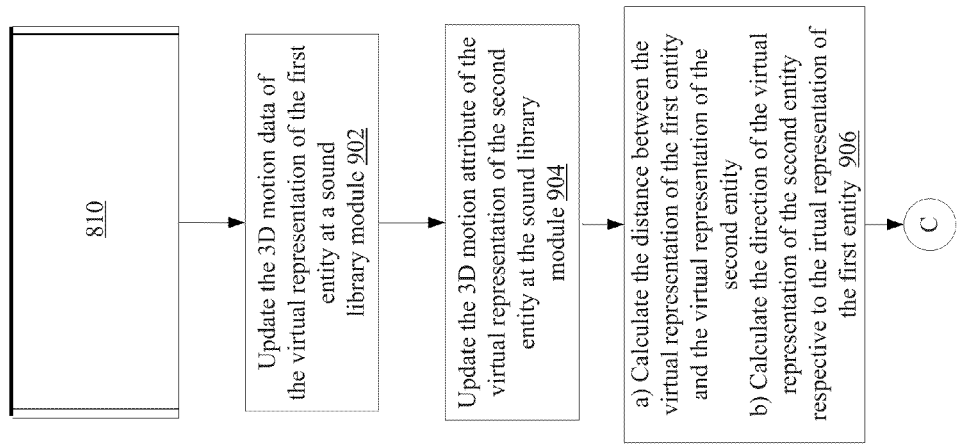
FIG. 9A illustrates a flow chart that depicts a method of audio mixing module and the sound library of the wearable computing device of the listener entity, according to certain exemplary embodiments of the present invention.

Now refer to FIG. 1-8B and FIG. 9A. FIG. 9A illustrates a flow chart that depicts a method of audio mixing module and the sound library of the wearable computing device of the listener entity, according to certain exemplary embodiments of the present invention. In operation 902, the motion update module 602 of the audio mixing module 502 is configured to call a function (e.g., subroutine) of the sound library 516 to update the 3D motion data of the sound emitter entity's avatar in the sound library 516. In operation 904 the motion update module 602 is configured to call a function of the sound library 516 to update a 3D motion data of the listener entity and/or the listener entity's avatar in the sound library 516 based on the 3D motion data of the listener entity and/or the listener entity's avatar. The 3D motion data of the sound emitter entity's avatar, the listener entity and/or the listener entity's avatar can be updated for every frame of the simulation.

In operation 906, using the processor 518, the sound library 516 calculates the distance between the avatars of the listener entity and the sound emitter entity in the simulated virtual environment 118. Further, in operation 906 the sound library 516 calculates the direction of the sound emitter entity's avatar in reference to the listener entity's avatar. The sound library 516 can calculate the direction and distance based on the updated 3D motion data of the listener entity, listener entity's avatar and/or the sound emitter entity's avatar. In an alternate embodiment, the simulator engine 402 can calculate the distance and direction and transmit the direction and distance to the wearable computing device 114 of the listener entity.

Figure 9B:
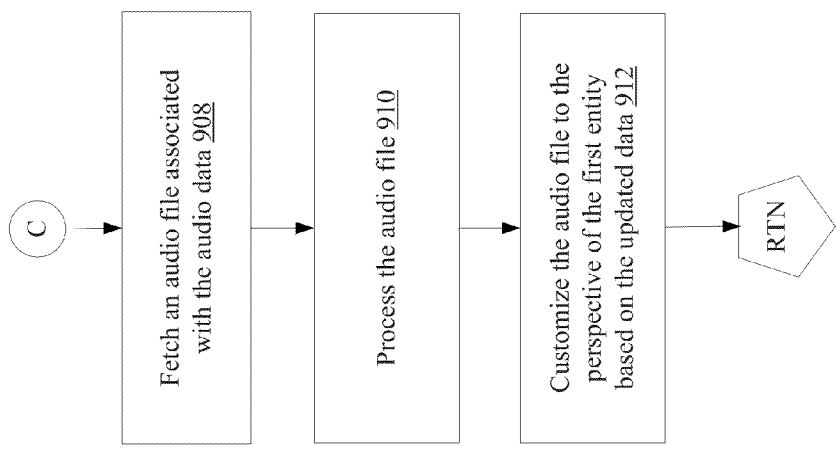
FIG. 9B illustrates a continuation of the flow chart shown in FIG. 9A, according to certain exemplary embodiments of the present invention.

Now refer to FIG. 1-9A and FIG. 9B. FIG. 9B illustrates a continuation of the flow chart shown in FIG. 9A, according to certain exemplary embodiments of the present invention. In operation 908, the audio mixing module 502 and/or the sound library 516 can fetch an audio file associated with the audio event. The audio file may be fetched from the memory 514 of the wearable computing device 114 of the listener entity. The audio file associated with audio event can be determined based on the audio data. In one embodiment, the audio data can include a state change identifier and an event identifier. In one embodiment, the audio data can be a signal encoded with the state change identifier and the event identifier. In another embodiment, the audio data can be a network packet that includes information that may be used by the sound library 516 and/or audio mixing module 502 to determine the audio file associated with the audio event and/or processing the audio file (i.e., the audio data need not contain the state change identifier and/or the event identifier, but information as described).

In operation 910, the audio mixing module 502 and/or the sound library 516 processes the audio file. Using the audio data, the audio mixing module 502 can call an appropriate function of the sound library 516 to process the audio file. In one embodiment, the audio file can be processed based on the state change identifier. In another embodiment, the audio file can be processed based on information conveyed by and/or included in the audio data. In one embodiment, processing the audio file can include playing a sound stored (e.g., encoded) in the audio file. In another embodiment, when the sound is playing, processing the audio file can include stop playing a sound. Further, the sound can incorporate all the audio attributes associated with the sound that are stored along with the sound in the audio file. The audio file can be processed with the audio attributes. The audio attributes may be associated with the audio event. The audio attributes may vary based on the audio event.

In operation 912, the sound library 516 customizes the audio file to the perspective of the listener entity. The audio file can be customized based on the updated 3D motion data of the listener entity, listener entity's avatar, the sound emitter entity's avatar, the distance between the listener entity's avatar and the sound emitter entity's avatar and/or the direction of the sound emitter entity's avatar. Further, the audio file is customized to provide a surround sound effect to the listener entity. Customizing the audio file can include setting the volume level for each sound based on attenuation by distance, and/or mix the sounds appropriately in each of the surround sound speakers (e.g., headphones, loudspeakers, etc.) to reflect the proper position and orientation of each sound being emitted with respect to the listener entity's head location. This will result in the listener entity hearing the sounds of the simulation through surround-sound headphones with the same audio cues as real life as it relates to the direction and distance of objects emitting sound. In one embodiment, the multi channel audio output data can be an audio file customized to the perspective of the listener entity with or without a surround sound effect.

Now refer back to FIG. 7B. In operation 710, the wearable computing device 114 of the listener entity can communicate the multi channel audio output data (e.g., customized audio file) to the listener entity via a surround sound audio output device, such as a surround sound headphone. The wearable computing device 114 of the listener entity can communicate the multi channel audio output data to the listener entity using the communication module 512. In one embodiment, the audio output device (e.g., surround sound headphones) may be coupled to the wearable computing device 114 of the listener entity. In another embodiment, the audio output device may be a surround sound speaker system that is appropriately set up to span a portion or entirety of the capture volume 102. For example, such as surround sound speakers set in multiple appropriate locations in the capture volume 102. In a further embodiment, the audio output device may not be physically attached to the wearable computing device, but communicatively coupled to the wearable computing device 114 of the listener entity.

In one example embodiment, the multi-channel audio output data may be outputted through surround sound headphones coupled (wired or wirelessly) to the wearable computing device 114 of the listener entity. In another example embodiment, the multi-channel audio output data may be outputted through a surround sound speaker system that is set up in appropriate locations of the capture volume 102 (e.g., listener entity may not need headphones to hear sound corresponding to the multi channel audio output data).

In one embodiment, the wearable computing device 114 of the listener entity may transmit the multi-channel audio output data to the surround sound speaker system (e.g., home theatre system) over a wireless link (or wired link in some embodiments). Further, the surround sound speaker system may render the multi-channel audio output data to the listener entity in the capture volume.

In an alternate embodiment, the listener entity may not be a capture entity (i.e. listener entity may not be motion captured) and further the listener entity may not be in the capture volume. For example, the listener entity may be an external observer or an operator who observes the simulated virtual environment 118 through the display device 410 that is at a location outside (or inside in some embodiments) the capture volume 102. In one embodiment, the listener entity that is not a capture entity can be inside the capture volume. Further, the listener entity may not be wearing the wearable computing device 114. In the said embodiment, where the listener entity is an external observer, the simulator engine 402 can generate the multi-channel audio output data based on the motion capture data of the sound emitter entity and the audio data associated with the audio event triggered by the sound emitter entity in the capture volume. The multi-channel audio output data may be associated with the audio event. If there are one or more sound emitter entities that trigger one or more audio events, the simulator engine 402 can generate the multi-channel output data comprising a mix of sounds (in the simulated virtual environment associated with sound emitter entity's avatar) associated with each of the audio event. The multi-channel audio output data can include a sound from the simulated virtual environment corresponding to the audio event triggered in the capture volume. Further, the simulator engine 402 can customize the multi-channel audio output data to the perspective of the external observer. In one embodiment, the external observer can choose the perspective from which the external observer wants the multi-channel audio output data to be rendered. For example, the external observer can choose to listen to multi-channel audio output data from a location X in the simulated virtual environment. The multi-channel audio output data may be rendered to the external observer as if the external observer were at location X in the simulated virtual environment even though the external observer may be at a remote location.

The simulator engine 402 can transmit the multi-channel audio output data to a surround sound audio output device coupled to a display device through which the external observer can view the simulated virtual environment. In another embodiment, the surround sound audio output device may not be coupled to the display device. The surround sound audio output device can render the multi-channel audio output data to the external observer either from the perspective of the external observer or from the perspective of a location chosen by the external observer, In an example embodiment, John Doe, Jane Doe and Jane Roe may be in a capture volume 102. Jane Doe and Jane Roe may be located on opposite sides of John Doe within 10 m of John Doe in the capture volume. However, in the simulated virtual environment Jane Doe's avatar may be 100 m away to the left of John Doe's avatar and Jane Roe's avatar may be 10 m away to the right of John Doe's avatar. In one embodiment, Jane Doe and Jane Roe may trigger separate audio events that may cause a corresponding sound to the played in the simulated virtual environment 118. The audio event triggered by Jane Doe may be firing Jane Doe's weapon in the capture volume 102. The audio data triggered by Jane Roe may be speaking the sentence "How are you?" to John Doe in the capture volume 102. In the simulated virtual environment 118, the audio event triggered by Jane Doe may be translated as Jane Doe's avatar firing a virtual gun. Further, the audio event triggered by Jane Roe may be translated as the Jane Roe's avatar asking "How are you?" to John Doe's avatar in the simulated virtual environment 118.

The motion capture data of John Doe, Jane Doe and Jane Roe may be captured using one or more motion capture devices 104. Further, using the motion capture data respective to each participant, the 3D motion data of the John Doe's avatar, Jane Doe's avatar and Jane Roe's avatar may be calculated. The simulator engine 402 may transmit and audio data corresponding to the two audio events and the 3D motion data of each of the avatars to the werarable computing device of John Doe. In one embodiment, the simulator engine 402 may transmit and audio data corresponding to the two audio events and the 3D motion data of each of the avatars to the wearable computing device of Jane Roe and Jane Doe as well.

The wearable computing device of John Doe can process the audio data corresponding to the two audio events and the 3D motion data of each of the avatars to generate a multi channel audio data customized to the perspective of John Doe's avatar. The multi-channel audio data can include a mix of sounds corresponding to both the audio events i.e the gun shot and the speech. The multi-channel audio data may be communicated to John Doe through surround sound headphones. The multi-channel audio data is customized such that John Doe hears the gun shot and the speech simultaneously. However, the gun shot is heard as if it occurred from the 100 m to the left of John Doe and the speech is heard as if it is from 10 m to the right of John Doe. In one embodiment, the volume of the gun shot may be lower than that of the speech from Jane Roe's avatar. Further, the sound of the gun shot may be played through the left speaker of the headphones and the speech may be played through the right speaker of the headphones.

Further, the wearable computing device of Jane Doe processes the 3D motion data of the avatar and both the audio data to generate another multi-channel audio output that is customized to the perspective of Jane Doe's avatar. The multi-channel audio output data of Jane Roe's wearable computing device comprises a mix of sound from both the audio event such that the gun shot is heard as if it occurred from the Jane Doe's avatar and the speech is heard (if the amplitude is high enough) as if it occurs from 110 m to the right of Jane Doe. Similarly, the wearable computing device of Jane Roe processes the 3D motion data of the avatar and both the audio data to generate another multi-channel audio output that is customized to the perspective of Jane Roe's avatar. The multi-channel audio output data of Jane Roe's wearable computing device comprises a mix of sound from both the audio event such that the gun shot is heard (if the amplitude is high enough) as if it occurred from 110 m to the left of Jane Roe's avatar and the speech is heard as if it occurs from Jane Roe's avatar.

In one embodiment, John Doe turns 90 degrees to the left in the capture volume 102 as Jane Roe is speaking and Jane Doe is firing the gun. Nearly simultaneously John Doe's avatar turns ninety degrees to the left in the simulated virtual environment 118. This places Jane Doe's avatar in front of John Doe's avatar and the Jane Roe's avatar behind John Doe's avatar. For the frame of simulation where John Doe's avatar turns 90 degrees to the left, another multi-channel audio output is generated which comprises the mix of sounds from both the audio events. The wearable computing device of John Doe processes the current 3D motion data of John Doe's avatar that has turned 90 degrees to the left, Jane Doe's avatar and Jane Roe's avatar along with both the audio data to generate the multi-channel audio output. The new multi-channel audio output customizes the sound of the gun shot such that John Doe's hears the gun shot as if it appears from 100 m in front of John Doe and the speech as heard as if it is occurring 10 m behind John Doe.

Each ear of the listener entity can get a unique 3D sound dynamically as the listener entity moves throughout the simulated virtual environment 118. As the listener entity approaches a sound emitter entity the sounds from the sound emitter entity can get louder as listener entity gets closer. Further, when the listerner entity turns the right ear to the sound emitter entity as the listener entity moves the sound from the sound emitter entity can get louder than in the left ear and vice versa. As the listener entity moves both ears' 3D sound signatures move with the listener entity based on the current motion data of the sound emiiter entity's avatar and the listerner entity's avatar.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A computer program product tangibly embodied in a non-transitory storage medium and comprising instructions that when executed by a processor perform a method, the method comprising:
   receiving, by a wearable computing device of a first entity, audio data that is generated responsive to a second entity triggering an audio event in a capture volume;
   receiving, by the wearable computing device of the first entity, three dimensional (3D) motion data of a virtual representation of the first entity in a simulated virtual environment, the 3D motion data of the virtual representation of the first entity is calculated based on 3D motion data of the first entity in the capture volume;
   receiving, by the wearable computing device of the first entity, 3D motion data of a virtual representation of the second entity in the simulated virtual environment; and
   processing the audio data, the 3D motion data of the virtual representation of the first entity and the 3D motion data of a virtual representation of the second entity to generate multi-channel audio output data customized to a perspective of the virtual representation of the first entity in the simulated virtual environment,
   wherein the multi-channel audio output data is associated with the audio event, and
   wherein generating the multi-channel audio output data comprises:
      updating, at a sound library module of the wearable computing device, the 3D motion data of the virtual representation of the first entity in the simulated virtual environment,
      updating, at the sound library module, the 3D motion data of the virtual representation of the second entity in the simulated virtual environment,
      calculating, by the sound library module, a distance between the virtual representation of the first entity and the virtual representation of the second entity in the simulated virtual environment, and
      calculating, by the sound library module, a direction of the virtual representation of the second entity in reference to the virtual representation the first entity in the simulated virtual environment,
         wherein the direction and the distance is calculated based on based on at least one of the updated 3D motion data of the virtual representation of the first entity and the updated 3D motion data of the virtual representation of the second entity.

2. The method of claim 1, further comprising:
communicating, by the wearable computing device of the first entity, the multi-channel audio output data to the first entity through a surround sound audio output device of the wearable computing device of the first entity.

3. The method of claim 1:
wherein the audio data comprises information that:
   associates the audio event to an audio file, and
   indicates a mode of processing the audio file, and
wherein the mode of processing the audio file comprises:
   playing the audio file,
   stop playing the audio file, and
   continue playing the audio file.

4. The method of claim 1, further comprising:
fetching, based on the audio data, an audio file associated with the audio event from a memory of the wearable computing device,
   wherein the audio file comprises at least one of a prerecorded sound and a live sound generated by the virtual representation of the second entity;
processing, based on the audio data, the audio file,
   wherein processing the audio data to comprise at least one of playing the audio file, stop playing the audio file and continue playing the audio file; and
processing, based on the direction and the distance, an audio attribute associated with the audio file to customize the audio file to the perspective of the virtual representation of the first entity,
   wherein the attribute of the audio file comprises at least one of least one of a decibel level, a sound attenuation fall-off distance, and a relative mix level.

5. The method of claim 4, further comprising:
customizing the audio file, based on the updated 3D motion data of the virtual representation of the first entity, the updated 3D motion data of the virtual representation of the second entity, and the audio datato generate the multi-channel audio output data having a surround sound effect from the perspective of the virtual representation of the first entity in the simulated virtual environment.

6. The method of claim 1, further comprising:
receiving, by the wearable computing device of the first entity, 3D motion data of the first entity in the capture volume,
wherein the second entity is a sound emitter entity, and wherein the first entity is a listener entity.

7. The method of claim 1:
wherein the first entity is a human being,
wherein the second entity is at least one of another human being and an inanimate object associated with the other human being,
wherein triggering the audio event by the second entity in the capture volume is reflected in the simulated virtual environment as triggering the audio event by the virtual representation of the second entity,
wherein the first entity and the second entity are co-located in the capture volume,
wherein a motion capture device in the capture volume captures an image of the capture volume that comprises the first entity and the second entity, the image can be used to determine the 3D motion data of at least one of the first entity and the second entity, and
wherein the virtual representation of the first entity and the virtual representation of the second entity are co-located in the simulated virtual environment.

8. The method of claim 7:
wherein the 3D motion data of the first entity comprises at least one of a position of the first entity's head in the capture volume, an orientation of the first entity's head in the capture volume and a velocity of motion of the first entity's head in the capture volume,
wherein the 3D motion data of the virtual representation of the second entity comprises at least one of a position of the virtual representation of the second entity in the simulated virtual environment, an orientation of the of the virtual representation of the second entity in the simulated virtual environment and a velocity of motion of the virtual representation of the second entity in the simulated virtual environment,
wherein the 3D motion data of the virtual representation of the second entity comprises a position of the inanimate object associated with virtual representation of the second entity in the simulated virtual environment, an orientation of the inanimate object associated with virtual representation of the second entity in the simulated virtual environment and a velocity of motion of the inanimate object associated with virtual representation of the second entity in the simulated virtual environment,
wherein the 3D motion data of the virtual representation of the second entity is determined based on 3D motion data of the second entity in the capture volume, and
wherein the 3D motion data of the second entity comprises at least one of a position of the second entity in the capture volume, an orientation of the second entity in the capture volume and a velocity of motion of the second entity in the capture volume.

9. A computer program product tangibly embodied in a non-transitory storage medium and comprising instructions that when executed by a processor perform a method, the method comprising:
receiving, by a wearable computing device of a first entity, audio data that is generated responsive to a second entity triggering an audio event in a simulated virtual environment;
receiving, by the wearable computing device of the first entity, three dimensional (3D) motion data of a virtual representation of the first entity in the simulated virtual environment, the 3D motion data of the virtual representation of the first entity is calculated based on 3D motion data of the first entity in a capture volume;
receiving, by the wearable computing device of the first entity, 3D motion data of the second entity in the simulated virtual environment,
wherein the second entity is at least one of a virtual object and a virtual character in the simulated virtual environment, and
wherein the virtual character is generated based on an artificial intelligence algorithm of a simulator engine; and
processing the audio data, the 3D motion data of the virtual representation of the first entity and the 3D motion data of the second entity to generate multi-channel audio output data customized to a perspective of the virtual representation of the first entity,
wherein the multi-channel audio output data is associated with the audio event, and
wherein generating the multi-channel audio output data comprises:
updating, at a sound library module of the wearable computing device, the 3D motion data of the virtual representation of the first entity in the simulated virtual environment,
updating, at the sound library module, the 3D motion data of the second entity in the simulated virtual environment,
calculating, by the sound library module, a distance between the virtual representation of the first entity and the second entity in the simulated virtual environment, and
calculating, by the sound library module, a direction of the second entity in reference to the virtual representation the first entity in the simulated virtual environment,
wherein the direction and the distance is calculated based on based on at least one of the updated 3D motion data of the virtual representation of the first entity and the updated 3D motion data of the second entity.

10. The method of claim 9, further comprising:
communicating, by the wearable computing device of the first entity, the multi-channel audio output data to the first entity through a surround sound audio output device of the wearable computing device of the first entity.

11. The method of claim 9:
wherein the audio data comprises information that:
associates the audio event to an audio file, and
indicates a mode of processing the audio file, and
wherein the mode of processing the audio file comprises:
playing the audio file,
stop playing the audio file, and
continue playing the audio file.

12. The method of claim 11, further comprising:
fetching, based on the audio data, the audio file associated with the audio event from a memory of the wearable computing device,
wherein the audio file comprises at least one of a live sound associated with the second entity and a prerecorded sound;

processing, based on the audio data, the audio file,
  wherein processing the audio data to comprise at least one of playing the audio file, stop playing the audio file and continue playing the audio file; and
processing, based on direction and the distance, an audio attribute associated with the audio file to customize the attribute of the audio file to the perspective of the virtual representation of the first entity,
  wherein an attribute of the audio file comprises at least one of least one of a sound file corresponding to the audio event, a decibel level, a sound attenuation fall-off distance, and a relative mix level.

13. The method of claim 12, further comprising:
customizing the audio file, based on the updated 3D motion data of the virtual representation of the first entity, the updated 3D motion data of the second entity, and the audio data to generate the multi-channel audio output data having a surround sound effect from the perspective of the virtual representation of the first entity in the simulated virtual environment.

14. The method of claim 9, further comprising:
receiving, by the wearable computing device of the first entity, 3D motion data of a the first entity in the capture volume,
  wherein the second entity is a sound emitter entity, and
  wherein the first entity is a listener entity.

15. A method comprising:
receiving, by a wearable computing device of a first entity, audio data that is generated responsive to a second entity triggering an audio event in a simulated virtual environment;
  wherein the first entity is located in a physical capture volume and the second entity is located in the simulated virtual environment, and
  wherein the virtual representation of the first entity and the second entity are co-located in the simulated virtual environment, and
receiving, by the wearable computing device of the first entity, three dimensional (3D) motion data of a virtual representation of the first entity in the simulated virtual environment, the 3D motion data of the virtual representation of the first entity is calculated based on 3D motion data of the first entity in a capture volume;
receiving, by the wearable computing device of the first entity, 3D motion data of the second entity in the simulated virtual environment,
  wherein the second entity is at least one of a virtual object and a virtual character in the simulated virtual environment,
  wherein the virtual character is generated based on an artificial intelligence algorithm of a simulator engine, and
  wherein the 3D motion data of the second entity comprises a position of the second entity in the simulated virtual environment, an orientation of the second entity in the simulated virtual environment and a velocity of motion of the second entity in the simulated virtual environment; and
processing the audio data, the 3D motion data of the virtual representation of the first entity and the 3D motion data of the second entity to generate multi-channel audio output data customized to a perspective of the virtual representation of the first entity,
  wherein the multi-channel audio output data is associated with the audio event,
  wherein triggering the audio event by the second entity represents the virtual character triggering the audio event in the simulated virtual environment.

16. A wearable computing device, comprising:
an audio reception module configured to receive audio data that is generated responsive to a second entity triggering an audio event;
a listener position module configured to receive three dimensional (3D) motion data of a virtual representation of the first entity in a simulated virtual environment, the 3D motion data of the virtual representation of the first entity is calculated based on 3D motion data of the first entity in a capture volume;
a relative position module configured to receive 3D motion data of a virtual representation of the second entity in the simulated virtual environment;
an audio mixing module configured to process the audio data, the 3D motion data of the virtual representation of the first entity and the 3D motion data of a virtual representation of the second entity to generate multi-channel audio output data customized to a perspective of the virtual representation of the first entity, wherein the multi-channel audio output data is associated with the audio event,
  wherein the audio mixing module comprises:
    a motion update module configured to update, at the sound library, the 3D motion data of the virtual representation of the first entity in the simulated virtual environment and the 3D motion data of the virtual representation of the second entity in the simulated virtual environment; and
    a position update module configured to calculate, at the sound library, a distance between the virtual representation of the first entity and the virtual representation of the second entity in the simulated virtual environment and a direction of the virtual representation of the second entity in reference to the virtual representation the first entity in the simulated virtual environment,
      wherein the direction and the distance is calculated based on at least one of the updated 3D motion data of the virtual representation of the first entity and the updated 3D motion data of the virtual representation of the second entity; and
a sound card module configured to communicate the multi-channel audio output data to the first entity through a surround sound audio output device of the wearable computing device of the first entity.

17. The wearable computing device of claim 16:
wherein the audio mixing module is configured to fetch an audio file associated with the audio event from a memory of the wearable computing device,
  wherein the audio data comprises information that:
    associates the audio event to the audio file, and
    indicates a mode of processing the audio file,
  wherein the mode of processing the audio file comprises:
    playing the audio file,
    stop playing the audio file, and
    continue playing the audio file,
wherein the audio file comprises at least one of a prerecorded sound and a live sound generated by the virtual representation of the second entity;
wherein the audio mixing module is configured to the audio file, wherein processing the audio data to comprise at least one of playing the audio file, stop playing the audio file and continue playing the audio file, and wherein the audio mixing module is configured to process based on direction and the distance, an audio attribute associated with the audio file to customize the audio file to the perspective of the virtual representation of the first entity, wherein the attribute of the audio file comprises at least one of least one of a decibel level, a sound attenuation fall-off distance and a relative mix level.

18. The wearable computing device of claim 17:

wherein the audio mixing module is configured to customize the audio file, based on the updated 3D motion data of the virtual representation of the first entity, the updated 3D motion data of the virtual representation of the second entity, and the audio data to generate the multi-channel audio output data having a surround sound effect from the perspective of the virtual representation of the first entity in the simulated virtual environment.

19. The wearable computing device of claim 16:

wherein the second entity is a sound emitter entity,
wherein the first entity is a listener entity,
wherein the first entity is a human being,
wherein the second entity is at least one of another human being and an inanimate object associated with the other human being,
wherein triggering the audio event by the second entity in the capture volume is reflected in the simulated virtual environment as the virtual representation of the second entity triggering the audio event,
wherein the first entity and the second entity are co-located in the capture volume,
wherein a motion capture device in the capture volume captures an image of the capture volume that comprises the first entity and the second entity, the image can be used to determine the 3D motion data of at least one of the first entity and the second entity, and
wherein the virtual representation of the first entity and the virtual representation of the second entity are co-located in the simulated virtual environment.

20. The wearable computing device of claim 19:

wherein the 3D motion data of the first entity comprises at least one of a position of the first entity's head in the capture volume, an orientation of the first entity's head in the capture volume and a velocity of motion of the first entity's head in the capture volume,
wherein the 3D motion data of the virtual representation of the second entity comprises at least one of a position of the virtual representation of the second entity in the simulated virtual environment, an orientation of the of the virtual representation of the second entity in the simulated virtual environment and a velocity of motion of the virtual representation of the second entity in the simulated virtual environment,
wherein the 3D motion data of the virtual representation of the second entity comprises a position of the inanimate object associated with virtual representation of the second entity in the simulated virtual environment, an orientation of the inanimate object associated with virtual representation of the second entity in the simulated virtual environment and a velocity of motion of the inanimate object associated with virtual representation of the second entity in the simulated virtual environment, wherein the 3D motion data of the virtual representation of the second entity is determined based on 3D motion data of the second entity in the capture volume, and
wherein the 3D motion data of the second entity comprises at least one of a position of the second entity in the capture volume, an orientation of the second entity in the capture volume and a velocity of motion of the second entity in the capture volume.

21. A computer program product tangibly embodied in a non-transitory storage medium and comprising instructions that when executed by a processor perform a method, the method comprising:

updating, at a sound library module, 3D motion data of a virtual representation of a first entity in a simulated virtual environment,
wherein the first entity is a human being, and wherein the 3D motion data of the first entity comprises at least one of a position of the first entity's head in the capture volume, an orientation of the first entity's head in the capture volume and a velocity of motion of the first entity's head in the capture volume;

updating, at the sound library module, 3D motion data of a virtual representation of a second entity in the simulated virtual environment,
wherein the second entity is at least one of another human being, animate object, and an inanimate object comprising at least one of a weapon and a model of a weapon,
wherein the 3D motion data of the virtual representation of the second entity comprises at least one of a position of the virtual representation of the second entity in the simulated virtual environment, an orientation of the of the virtual representation of the second entity in the simulated virtual environment, a velocity of motion of the virtual representation of the second entity in the simulated virtual environment, a position of the inanimate object associated with virtual representation of the second entity in the simulated virtual environment, an orientation of the inanimate object associated with virtual representation of the second entity in the simulated virtual environment and a velocity of motion of the inanimate object associated with virtual representation of the second entity in the simulated virtual environment,
wherein the 3D motion data of the virtual representation of the second entity is determined based on 3D motion data of the second entity in the capture volume, and
wherein the 3D motion data of the second entity comprises at least one of a position of the second entity in the capture volume, an orientation of the second entity in the capture volume and a velocity of motion of the second entity in the capture volume calculating, by the sound library module, a distance between the virtual representation of the first entity and the virtual representation of the second entity in the simulated virtual environment,
calculating, by the sound library module, a direction of the virtual representation of the second entity in reference to the virtual representation the first entity in the simulated virtual environment,
wherein the direction and the distance are calculated based on based on at least one of the updated 3D motion data of the virtual representation of the first entity and the updated 3D motion data of the virtual representation of the second entity; and
processing, based on the distance and the direction, an audio data associated with an audio event triggered by the second entity to generate multi-channel audio output data customized to a perspective of the virtual representation of the first entity.

22. The method of claim 21, wherein processing the audio data associated with an audio event to generate the multi-channel audio output data customized to a perspective of the virtual representation of the first entity, further comprises:
fetching, based on the audio data, an audio file associated with the audio event from a memory of the wearable computing device,
wherein the audio data comprises information that:
associates the audio event to the audio file, and
indicates a mode of processing the audio file,
wherein the mode of processing the audio file comprises:
playing the audio file,
stop playing the audio file, and
continue playing the audio file,
wherein the audio file comprises at least one of a prerecorded sound and a live sound generated by the virtual representation of the second entity;
processing, based on the audio data, the audio file,
wherein processing the audio data to comprise at least one of playing the audio file stop playing the audio file and continue playing the audio file;
processing, based on direction and the distance, an audio attribute associated with the audio file to customize the audio file to the perspective of the virtual representation of the first entity,
wherein the attribute of the audio file comprises at least one of least one of a decibel level, a sound attenuation fall-off distance and a relative mix level; and
customizing the audio file, based on the updated 3D motion data of the virtual representation of the first entity, the updated 3D motion data of the virtual representation of the second entity and the audio data to generate the multi-channel audio output data having a surround sound effect from the perspective of the virtual representation of the first entity in the simulated virtual environment.

23. The method of claim 21:
wherein the second entity is a sound emitter entity,
wherein the first entity is a listener entity, and
wherein at least one of the 3D motion data of the first entity, the 3D motion data of the virtual representation of the second entity and the audio data is received from a simulator engine.

24. A system, comprising:
a motion capture device configured to motion capture at least one of a first entity and a second entity in a capture volume based on trackable objects coupled to the first entity and the second entity, the first entity and the second entity being co-located in the capture volume,
wherein the first entity is a human being and the second entity is at least one of another human being, animate object and an inanimate object comprising at least one of a weapon and a model of a weapon;
a tracking device coupled to the motion capture device, configured to determine 3D motion data of at least of the first entity and the second entity;
a simulation engine coupled to the motion capture device, configured to transmit 3D motion data of at least one of a virtual representation of the first entity in a simulated virtual environment, the 3D motion data of the first entity, a virtual representation of the second entity in a simulated virtual environment and audio data; and
a wearable computing device of a first entity communicatively coupled to the simulation engine, wherein the wearable computing device of the first entity is configured to:
receive from the simulator engine, the audio data generated by the second entity responsive to the second entity triggering an audio event that is reflected in the simulated virtual environment as the virtual representation of the second entity triggering the audio event;
receive from the simulator engine, the 3D motion data of the virtual representation of the first entity;
receive from the simulator engine, the 3D motion data of the virtual representation of the second entity;
process the audio data, the 3D motion data of the virtual representation of the first entity and the 3D motion data of the virtual representation of the second entity to generate a multi-channel audio output data customized to a perspective of virtual representation of the first entity, wherein the multi-channel audio output data is associated with the audio event; and
communicate the multi-channel audio output data to the first entity through a surround sound audio output device of the wearable computing device of the first entity,
wherein a motion capture device in the capture volume captures an image of the capture volume that comprises the first entity and the second entity, the image can be used to determine the 3D motion data of at least one of the first entity and the second entity,
wherein the virtual representation of the first entity and the virtual representation of the second entity are co-located in the simulated virtual environment,
wherein the 3D motion data of the first entity comprises at least one of a position of the first entity's head in the capture volume, an orientation of the first entity's head in the capture volume and a velocity of motion of the first entity's head in the capture volume,
wherein the 3D motion data of the virtual representation of the second entity comprises at least one of a position of the virtual representation of the second entity in the simulated virtual environment, an orientation of the of the virtual representation of the second entity in the simulated virtual environment, a velocity of motion of the virtual representation of the second entity in the simulated virtual environment, a position of the inanimate object associated with virtual representation of the second entity in the simulated virtual environment, an orientation of the inanimate object associated with virtual representation of the second entity in the simulated virtual environment and a velocity of motion of the inanimate object associated with virtual representation of the second entity in the simulated virtual environment,
wherein the 3D motion data of the virtual representation of the second entity is determined based on 3D motion data of the second entity in the capture volume, and
wherein the 3D motion data of the second entity comprises at least one of a position of the second entity in the capture volume, an orientation of the second entity in the capture volume and a velocity of motion of the second entity in the capture volume.

25. The system of claim 24:
wherein the simulator engine is configured to determine the 3D motion data of the virtual representation of the first entity,
wherein the simulator engine is configured to determine the 3D motion data of the virtual representation of the second entity,
wherein the simulator engine is configured to generate an audio data comprising information that:
associates the audio event to an audio file, and
indicates a mode of processing the audio file, and
wherein the mode of processing the audio file comprises:
playing the audio file,
stop playing the audio file, and
continue playing the audio file.

26. The method of claim 24:
wherein the first entity is in a first capture volume and the second entity is in a second capture volume,
wherein the first capture volume is at a remote location from a second capture volume, and
wherein the first capture volume and the second capture volume are communicatively coupled.

* * * * *